(12) United States Patent
Abe

(10) Patent No.: US 11,698,765 B2
(45) Date of Patent: Jul. 11, 2023

(54) PRINT SYSTEM HAVING PRINT CONTENT NOTIFICATION, CONTROL METHOD, AND STORAGE MEDIUM

(71) Applicant: CANON KABUSHIKI KAISHA, Tokyo (JP)

(72) Inventor: Koichi Abe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/530,592

(22) Filed: Nov. 19, 2021

(65) Prior Publication Data

US 2022/0171589 A1 Jun. 2, 2022

(30) Foreign Application Priority Data

Nov. 27, 2020 (JP) .................................. 2020-197192

(51) Int. Cl.
G06F 3/12 (2006.01)
H04N 1/00 (2006.01)

(52) U.S. Cl.
CPC ............ *G06F 3/1288* (2013.01); *G06F 3/126* (2013.01); *G06F 3/1211* (2013.01); *G06F 3/1236* (2013.01); *H04N 1/00464* (2013.01)

(58) Field of Classification Search
None
See application file for complete search history.

(56) References Cited

U.S. PATENT DOCUMENTS

| | | | |
|---|---|---|---|
| 8,438,556 B2 | 5/2013 | Abe | |
| 8,629,995 B2 | 1/2014 | Abe | |
| 8,780,377 B2 | 7/2014 | Nishida et al. | |
| 11,249,707 B2 * | 2/2022 | Kikuchi | H04L 51/046 |
| 11,297,015 B2 * | 4/2022 | Miyata | H04L 51/18 |
| 11,409,486 B2 * | 8/2022 | Abe | G06F 3/1204 |
| 2012/0005378 A1 | 1/2012 | Abe et al. | |
| 2015/0381827 A1 * | 12/2015 | Kambegawa | H04N 1/32101 358/1.15 |
| 2016/0259601 A1 * | 9/2016 | Dalaa | G06F 3/1288 |
| 2017/0070642 A1 * | 3/2017 | Miyamoto | G06F 3/1226 |
| 2018/0213095 A1 * | 7/2018 | Miura | G06F 3/126 |
| 2019/0012123 A1 * | 1/2019 | Takahashi | G06F 3/1238 |
| 2019/0258431 A1 * | 8/2019 | Yamamoto | G06F 3/1268 |
| 2019/0288963 A1 | 9/2019 | Sugimoto et al. | |

FOREIGN PATENT DOCUMENTS

JP 2018-207337 A 12/2018

OTHER PUBLICATIONS

European Search Report dated Apr. 19, 2022, in related European Patent Application No. 21209642.4.

* cited by examiner

*Primary Examiner* — Henok Shiferaw
(74) *Attorney, Agent, or Firm* — Venable LLP

(57) ABSTRACT

A print system includes a printing apparatus to print content according to a print job, and a server system to provide at least one of video information or still image information for an online class to a client terminal as distribution information. The client terminal receives notification information indicating that printable study material for an online class is present as the print content, and a print job for printing the study material is issued.

15 Claims, 19 Drawing Sheets

| CONNECT ID | PRINTER ID | PRINTER MODEL | PERIOD OF VALIDITY |
|---|---|---|---|
| amskri6ej | 05001 | P0001 | 2017/12/21 10:00 |
| krnbt58hr | 01052 | P0002 | 2017/12/21 10:02 |
| 2sefjr6sd | 35126 | P0001 | 2017/12/21 10:25 |
| r52wud6rz | 03679 | P0052 | 2017/12/21 10:26 |
| abdbdc612 | 05001 | P0001 | 2017/12/22 11:25 |

FIG.6

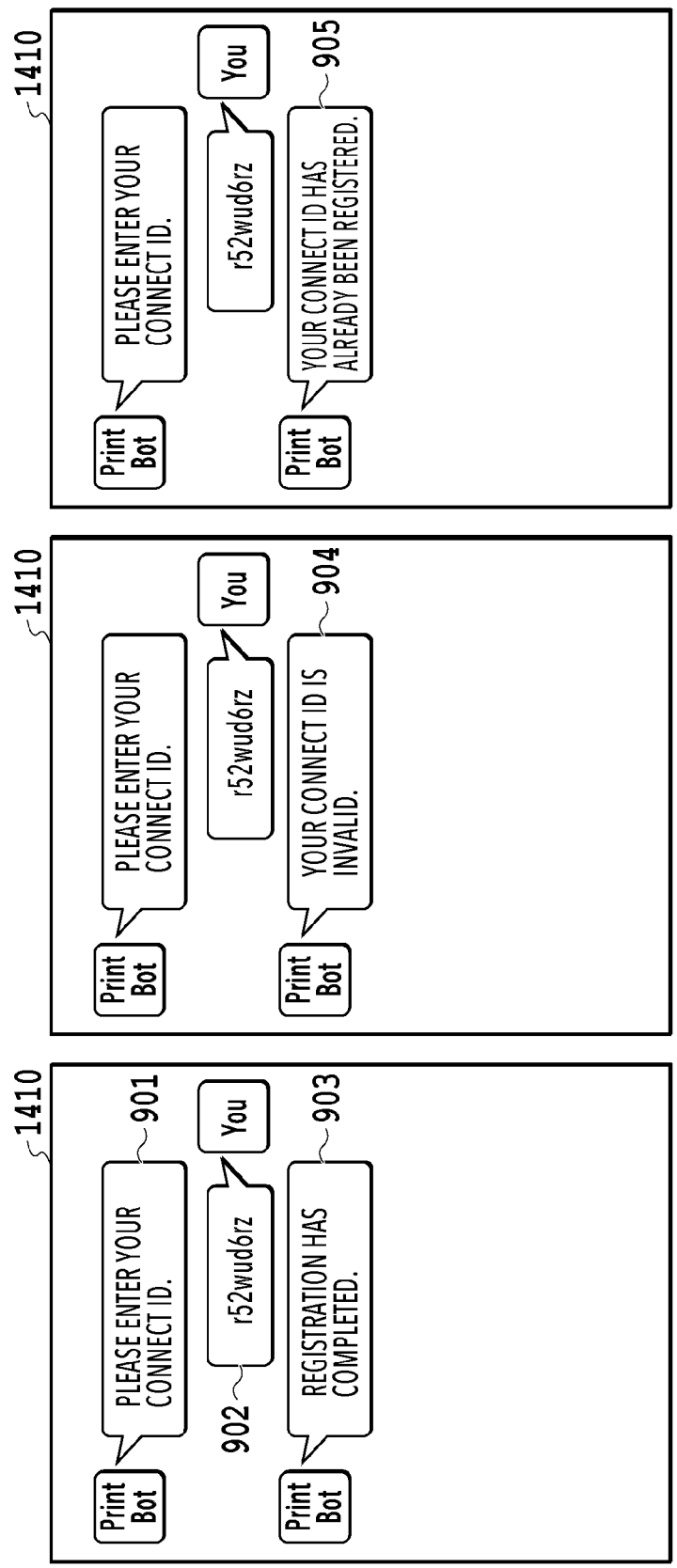

| IDENTIFICATION INFORMATION (USER ID) | CLIENT USER NAME | PRINTER ID | MODEL NAME |
|---|---|---|---|
| C0001 | Natsu Abe | 03679 | P0002 |
| C0673 | Koichi Osaka | 35126 | P0001 |

| APPLICATION ID | PRINTER ID |
|---|---|
| BOT0001 | 03679 |
| BOT0001 | 35126 |

| IDENTIFICATION INFORMATION (USER ID) | PASSWORD | CLIENT USER NAME | GRADE | PRINTED STUDY MATERIAL CONTENT ID |
|---|---|---|---|---|
| C0001 | Kirachu | Natsu Abe | GRADE 8 | A002 |
| C0673 | Cute | Koichi Osaka | GRADE 12 | B002 |

| CLASS ID | DATE AND TIME | GRADE | SUBJECT | TEACHER | VIDEO CONTENT ID | STUDY MATERIAL CONTENT ID AND DISTRIBUTION TIME |
|---|---|---|---|---|---|---|
| A00101 | 2017/12/20 Wed 17:00-17:50 | GRADE 8 | MATH | Chancy | A001 | (A002,17:30),(A003,17:35) |
| B00104 | 2017/12/21 Thu 18:00-18:50 | GRADE 12 | ENGLISH | Tam | B001 | (B002,18:20) |

| STUDY MATERIAL CONTENT ID | FILE | TITLE | DESCRIPTION | NO. OF PAGES | PRICE |
|---|---|---|---|---|---|
| A002 | File2.pdf | GRADE-8 MATHEMATICS REVIEW EXERCISE BOOK 2 | PART 2 OF GRADE-8 MATHEMATICS REVIEW EXERCISE BOOK | 15 | ¥0 |
| A003 | File3.pdf | GRADE-8 MATHEMATICS PREPARATION EXERCISE BOOK 2 | PART 3 OF GRADE-8 MATHEMATICS PREPARATION EXERCISE BOOK | 10 | ¥0 |
| B002 | File4.pdf | GRADE-12 ENGLISH ADVANCED EXERCISE BOOK 3 | PART 3 OF GRADE-12 ADVANCED EXERCISE BOOK - YOUR TICKET TO ENTER COMPETITIVE UNIVERSITY! | 100 | ¥10,000 |

| VIDEO CONTENT ID | FILE | TITLE | DESCRIPTION | TEACHER |
|---|---|---|---|---|
| A001 | File1.mp4 | GRADE-8 MATH #2 | GRADE-8 MATHEMATICS: 2ND ONLINE RECORDED CLASS | Chancy |
| B001 | Live | GRADE-12 ENGLISH #3 | GRADE-12 ENGLISH: ONLINE LIVE CLASS | Tam |

FIG.10F

| IDENTIFICATION INFORMATION (USER ID) | CLASS | TUITION (MONTHLY) | STUDY MATERIAL FEE |
|---|---|---|---|
| C0001 | GRADE-8: 3 STANDARD SUBJECTS (ENGLISH, MATH, JAPANESE) | ¥4,5000 | ¥0 |
| C0673 | GRADE-12: 2 HIGH-LEVEL SUBJECTS (ENGLISH, MATH) | ¥120,000 | ¥10,000 (PURCHASE DATE: 12/21/2017) |

FIG.10G

| PRINT REQUEST ID | PRINT SETTINGS | IDENTIFICATION INFORMATION (USER ID) | FILE | STUDY MATERIAL CONTENT ID | APPLICATION ID | PRINTER ID |
|---|---|---|---|---|---|---|
| PR0088 | PR0088.xml | C0001 | File2.pdf | A002 | BOT0001 | 03679 |
| PR0777 | PR0777.xml | C0673 | File4.pdf | B002 | BOT0001 | 35126 |
| PR1555 | PR1555.xml | C0673 | File4.pdf | B002 | BOT0001 | 35126 |

FIG.10H

| PRINT JOB ID | PRINT SETTINGS | FILE | IDENTIFICATION INFORMATION (USER ID) | STUDY MATERIAL CONTENT ID | PRINT DATA | PRINT RESULT AND NUMBER OF PRINTED PAGES |
|---|---|---|---|---|---|---|
| PJ0088 | PJ0088.xml | File2.pdf | C0001 | A002 | PJ0088.prn | Success,15 |
| PJ0777 | PJ0777.xml | File4.pdf | C0673 | B002 | PJ0777.prn | Success,100 |
| PJ1555 | PJ1555.xml | File4.pdf | C0673 | B002 | PJ1555.prn | Canceled,80 |

CLASS ID : A00101

1501 ID:A001 | File1.mp4

1502 DATE AND TIME: 12/20/2017 Wed 17:00 TO 17:50
GRADE: 8  SUBJECT: MATH  TEACHER: Chancy   1503 Delete 1504 ID:A002 | File2.pdf 1505 GRADE-8 MATHEMATICS REVIEW EXERCISE BOOK 2  PRICE: ¥0   1506 Delete 1507 ID:A003 | File3.pdf 1508 GRADE-8 MATHEMATICS PREPARATION EXERCISE BOOK 3  PRICE: ¥0   1509 Delete

1510 ⊕

CLASS ID : B00104

1511 ID : B001 | Live

1512 DATE AND TIME: 12/21/2017 Thu 18:00 TO 18:50
GRADE: 12  SUBJECT: ENGLISH  TEACHER: Tam   1513 Delete 1514 ID : B002 | File4.pdf 1515 GRADE-12 ENGLISH ADVANCED EXERCISE BOOK 3  PRICE: ¥10,000   1516 Delete

1517 ⊕

1518 ⊕

1550

1650

Name: Natsu Abe  ~1601

User ID: C0001  ~1602  GRADE: 8  ~1603

TIMETABLE:
Mon  15:00 TO 15:30  ENGLISH  TEACHER: Joe
Wed  17:00 TO 17:50  MATH  TEACHER: Chancy
Fri  19:00 TO 19:30  JAPANESE  TEACHER: Star

~1604

Edit ~1605
Delete ~1606

Name: Koichi Osaka  ~1607

User ID: C0673  ~1608  GRADE: 12  ~1609

TIMETABLE:
Tue  14:00 TO 14:50  MATH  TEACHER: Pochy
Thu  18:00 TO 18:50  ENGLISH  TEACHER: Tam

~1610

Edit ~1611
Delete ~1612

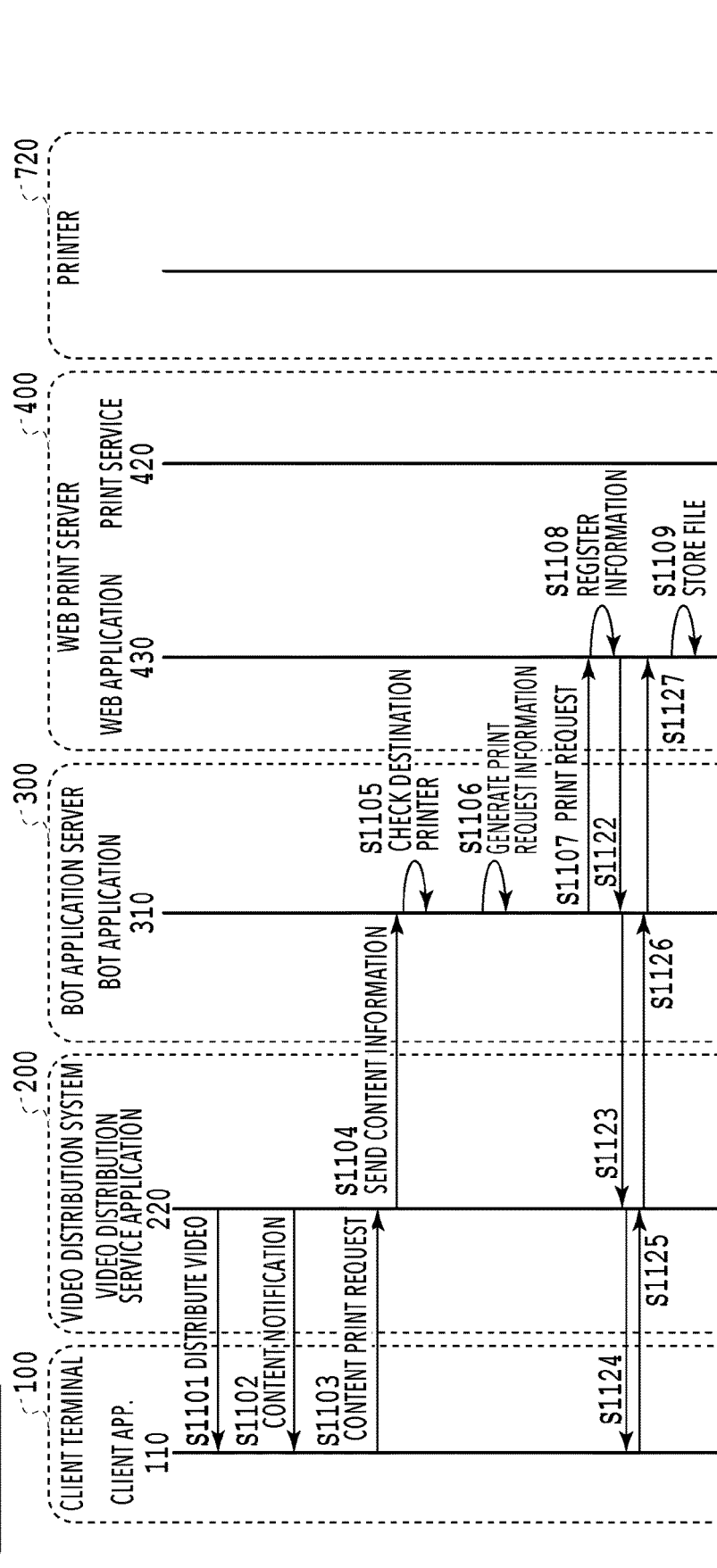

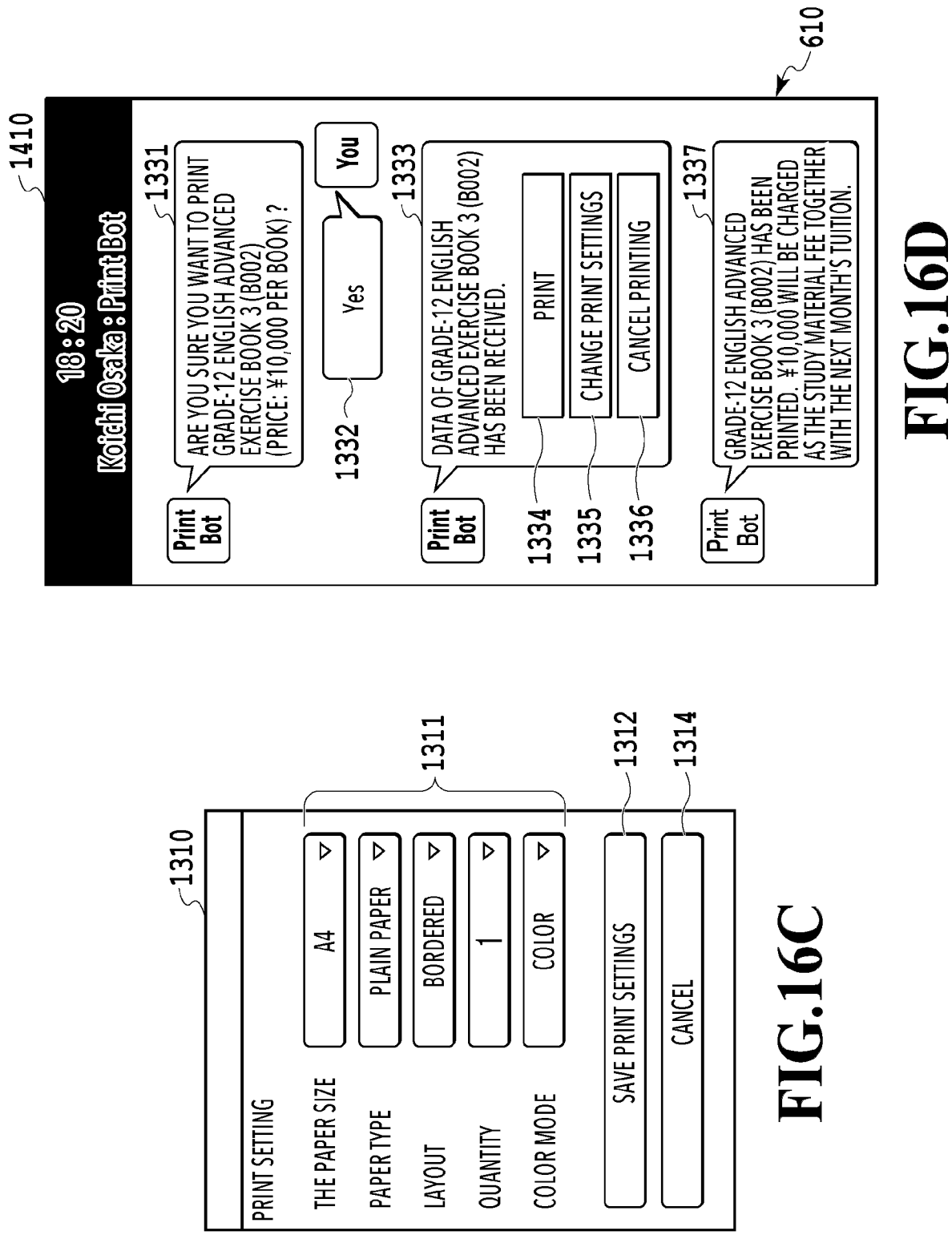

PRINT SYSTEM HAVING PRINT CONTENT NOTIFICATION, CONTROL METHOD, AND STORAGE MEDIUM

BACKGROUND

Field

The present feature relates to a print system, a control method, and a storage medium.

Description of the Related Art

The progress of information communication technology has enabled various types of information communication to be performed between remote locations by using instruments connected to networks. Japanese Patent Laid-Open No. 2018-207337 discloses a technique in which apparatuses installed at a plurality of sites are connected via a network to perform a video conference. Also, educational institutions, such as schools and crammers, and the like now provide, for example, online classes in which a client server system distributes the contents of classes to a plurality of attenders' client terminals. For such online classes, the study materials and the like to be used are printed out or bound into a book and distributed or mailed to the students or attenders.

SUMMARY

Japanese Patent Laid-Open No. 2018-207337 does not describe processing for a situation where printing is needed. Also, in conferences and classes that take place via a network as the above, necessary documents, study materials, etc. are sometime distributed in the form of printed products. In this case, the organizers and the educational institutions print the documents, study materials, etc. or bind them into books and mail or deliver them to the target individuals, and the work of doing so requires a large amount of cost and time. Moreover, in classes, conferences, and the like, the attenders and participants cannot print the study materials and documents in real time.

An object of various embodiments of the present disclosure is to provide a technique capable of easily obtaining a printed product in a timely manner by using a client terminal connected to a server system.

Various embodiments provide a print system including: a client terminal (100); a server system (200, 300, 400) that provides predetermined distribution information to the client terminal (100); and at least one printing apparatus (500, 720) communicatively connected to the server system (200, 300, 400), in which the server system includes a notification unit (200) that notifies the client terminal (100) of notification information indicating that a printable print content is present based on provision of the distribution information to the client terminal (100), the client terminal (100) includes a print request unit (110, 6000) capable of sending the server system a print request as a request to perform printing in a case of being notified of the notification information, the server system further includes a job issuance unit (420) that issues a print job for printing the print content to a printing apparatus (500, 720) identified by the print request from the client terminal (100), and the printing apparatus (500, 720) prints the print content according to the print job.

According to the present various embodiments, it is possible to easily obtain a printed product in a timely manner by using a client terminal connected to a server system.

Further features will become apparent from the following description of exemplary embodiments with reference to the attached drawings.

BRIEF DESCRIPTION OF THE DRAWINGS

FIG. 6 is a diagram illustrating an example of the configuration of a connect ID management table;

FIGS. 9A to 9C are diagrams illustrating examples of a message talk screen in the registration processing;

FIGS. 10A to 10I are diagrams illustrating an example of management tables;

FIG. 13 is a diagram illustrating an example of an online class management screen;

FIG. 14 is a diagram illustrating an example of an online class attender management screen;

FIG. 15 is a diagram that shows a relationship between FIG. 15A and FIG. 15B;

FIGS. 15A and 15B are sequence charts related to print processing; and

FIGS. 16A to 16D are diagrams for explaining printing operations.

DESCRIPTION OF THE EMBODIMENTS

A preferred embodiment will be specifically described with reference to the accompanying drawings. Note that the following embodiment does not limit the present feature according to the claims, and not all the combinations of the features described in the embodiment are necessarily essential for the solution to be provided by the present feature.

A system in which a web print server, a video distribution system, and a bot application server cooperate with each other will be described as an embodiment of the present feature. The description will be given with an example in which, in this system, a user designates a printing target study material content (file) and issues an instruction to print it via a video distribution service application. Note that the printing target file to be used in the present embodiment may be image data or document data. The printing target file may also be called the printing target content. Note that in the present embodiment the video distribution service application may also be simply called the video distribution app as well.

[System Configuration]

First, a configuration of the system according to the present embodiment will be described.

Figure 1:
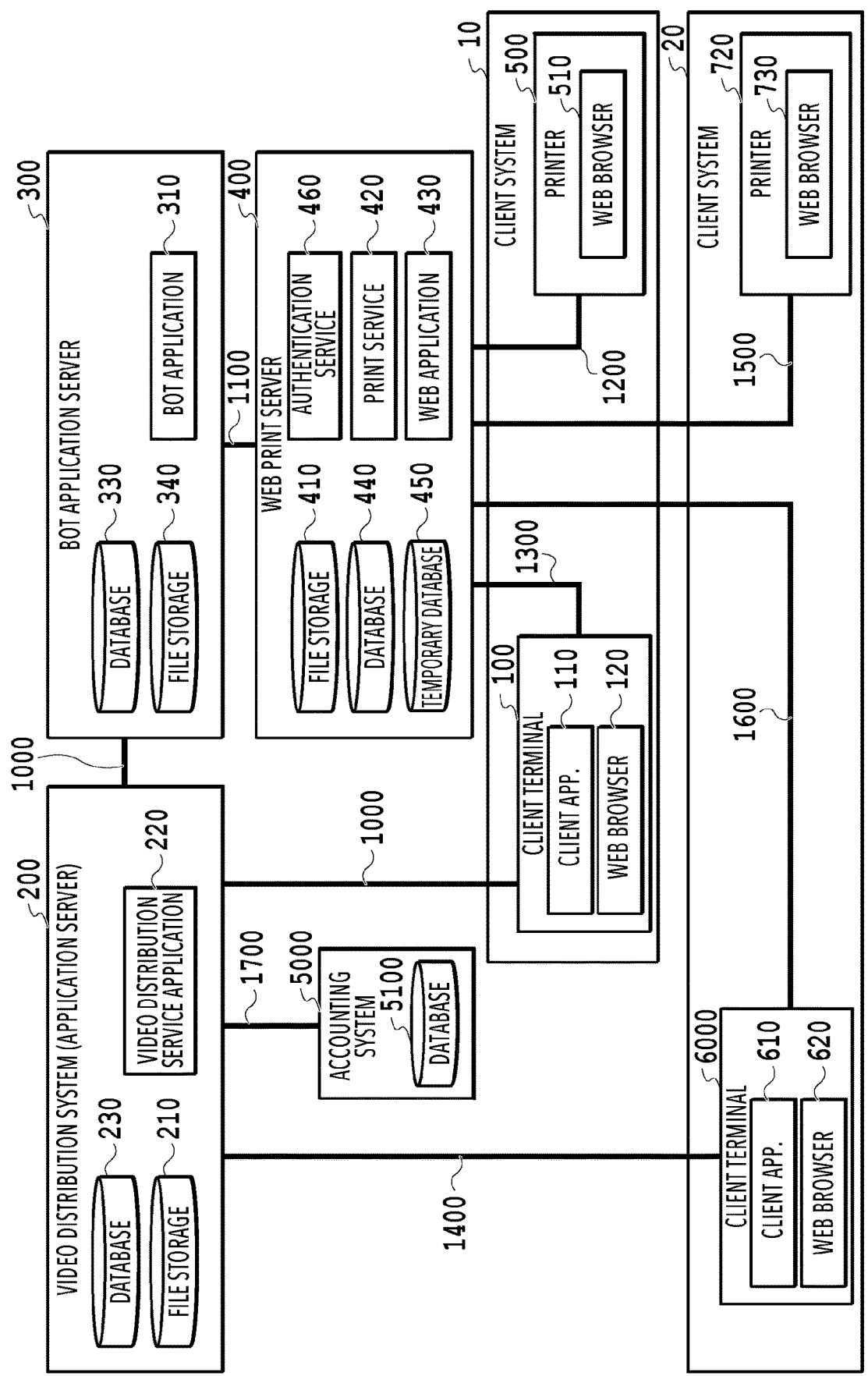
FIG. 1 is a diagram illustrating an example of the configuration of a client-server network system.

The print system according to the present embodiment is configured as a client-server network system. FIG. 1 is a diagram illustrating an example of the configuration of the network system according to the present embodiment. The network system according to the present embodiment includes: a client system 10 including a client terminal 100 and a printing apparatus (hereinafter referred to as "printer") 500; and a client system 20 including a client terminal 6000 and a printer 720. The network system further includes a server system capable of mutually communicating with the client systems. The server system includes a video distribution system 200 (application server (first server)), a bot application server (second server) 300, and a web print server (third server) 400.

In FIG. 1, the video distribution system 200 is connected to each of the client terminal 100 and the bot application server 300 via a network 1000. The video distribution system 200 is further connected to the client terminal 6000 via a network 1400 and connected to an accounting system 5000 via a network 1700. The accounting system 5000 is a system that performs management of tuitions, study material fees, and the like to be charged to students, management of deposits and withdrawals, and the like. The accounting system 5000 includes a database 5100, and the information managed by the accounting system 5000 is stored in the database 5100.

Also, the bot application server 300 and the web print server 400 are mutually communicatively connected to each other via a network 1100. The web print server 400 is mutually communicatively connected to the client terminal 100 via a network 1300 and mutually communicatively connected to the client terminal 6000 via a network 1600. Further, the web print server 400 is mutually communicatively connected to the printer 720 of the client system 20 via a network 1500 and mutually communicatively connected to the printer 500 of the client system 10 via a network 1200. Note that there are two client systems 10 and 20 illustrated in FIG. 1, but the number of client systems is not limited to the example illustrated in FIG. 1, and three or more may be present. Also, the bot application server 300 and the web print server 400 may each be formed of a server system with a plurality of servers to distribute the load among them. Moreover, the video distribution system 200 may also be a server system including one server or a plurality of servers. Furthermore, some of the functions of the video distribution system 200, the bot application server 300, and the web print server 400 may be implemented by other servers. Alternatively, a configuration using a server equipped with all of the functions of the video distribution system 200, the bot application server 300, and the web print server 400 may be employed.

The networks 1000 to 1700 may each be one of, for example, a LAN or WAN of the Internet or the like, a telephone line, a dedicated digital line, an ATM or frame relay line, a cable television line, a radio line for data broadcast, or the like. Alternatively, they may only need to be ones capable of sending and receiving data, such as so-called communication networks implemented by combining the above, and may be wired or wireless. Also, the configuration may be such that the networks 1000 to 1700 are different networks or use the same network.

A configuration of each client system will be described by taking the client system 10 as an example. The client terminal 100 is an information processing apparatus such, for example, as a personal computer (PC), a smartphone, or a tablet terminal, and is operated by a user. The client terminal 100 includes a client app 110 and a web browser 120. Note that the client app 110 will also be referred to as the client app 110 in the present embodiment. The client app 110 is capable of sending a message containing a character string(s) input by a user operation, a request to print a printing target study material content (file), and the like to a video distribution service application 220 via the network 1000. The client app 110 also notifies the user of messages received from the video distribution service application (hereinafter referred to as "video distribution app") 220 via the network 1000. Note that the user is notified of the messages basically by displaying them in a screen of the client app 110 but may be notified of them by means of voice and sound. The client app 110 is also used in a case of participating in an online class distributed by the video distribution app 220 of the video distribution system 200.

The web browser 120 is an application that displays web pages. The web browser 120 displays a web page provided by a web application 430 included in the web print server 400 via the network 1300. The web browser 120 also receives operations from the user using the client terminal 100. Note that the web page to be displayed by the web browser 120 is not limited to the web page provided by the web application 430 of the web print server 400. For example, a screen related to the video distribution system 200 may be displayed on the web browser 120. Moreover, the web page description language is assumed to be the Hypertext Markup Language (HTML) in the present embodiment, but is not particularly limited. The client system 20 has a similar configuration to that of the client system 10.

The video distribution system 200 includes a file storage 210, the video distribution app 220, and a database 230. The file storage 210 stores video contents (files), study material contents (files), and the like as distribution information to be distributed by the video distribution app 220. The video distribution system 200 is a web service present in the Internet and provides a video distribution service.

To connect to the video distribution system 200 and participate in an online class, the client app 110 applicable to the video distribution system 200 needs to be installed in the client terminal 100 or the like of the participant of the online class. Note that, the client app 110 will also be abbreviated as "client app" below.

The participant of the online class can participate in the online class by installing the client app 110 into the client terminal 100 and executing it. The video distribution app 220 receives a message, a request to print a printing target study material content (file), and the like sent from the client app 110 of the client terminal 100. Then, in response to receiving what has been sent from the client app 110, the video distribution app 220 sends a message receiving event to a bot application 310 of the bot application server 300 via the network 1000. In response to receiving the receiving event, the bot application 310, for example, requests printing of the study material content or the like to be described later (S1107 (FIG. 15A)).

Also, based on a request from the bot application 310, the video distribution app 220 sends a message to the client app 110. Moreover, the video distribution app 220 sends information on the printing target study material content stored in the file storage 210 (the path (URI) to the area storing the file of the print content) to the bot application 310. Note that, though not illustrated in FIG. 1, the video distribution system 200 performs message relay processing in a case where the plurality of client terminals exchange messages with each other. For example, a message sent from the client app 110 is sent to a client app 610 via the video distribution app 220.

The bot application server 300 includes the bot application 310, a database 330, and a file storage 340. The bot application 310 receives an event notification from the video distribution app 220 of the video distribution system 200, and executes processing corresponding to the content of the received event. Also, the bot application 310 sends a message sending request to the video distribution app 220 as necessary via the network 1000. The bot application 310 is handled by the video distribution system 200 as a virtual user of the video distribution app 220 or a virtual participant in an online class. Moreover, the bot application 310 is capable of sending and receiving messages to and from the client apps 110 and 610 of the client terminals 100 and 6000 connected thereto. Note that the bot application 310 may automatically create and send messages as responses to messages sent from the client apps. For example, in a case where the client app 110 sends a message "Hello" to the bot application 310, the bot application 310 may respond with a response message "Hello". Also, the database 330 of the bot application server 300 stores information on a printer each user owns.

The web print server 400 provides a print service. The print service herein refers to a service that sends an externally received print/scan instruction to registered printers (e.g., the printers 500 and 720) via the networks 1200 and 1500 and causes the registered printers to execute the instruction. The web print server 400 includes a file storage 410, a print service 420, the web application 430, a database 440, a temporary storage database 450, and an authentication service 460.

The authentication service 460 of the web print server 400 is a service that, in a case of receiving access from the client terminals 100 and 6000 or the printers 500 and 720, performs authentication of the access sources by using pieces of registered account information thereof. The use of the print service is permitted only in a case where the authentication by the authentication service 460 succeeds. Note that each piece of account information in the present embodiment contains at least a user ID and a password. Further, it is assumed that the users of the client apps 110 and 610 have already registered information on the respective printers 500 and 720 which the users own (can use). Although the present embodiment will be described on the assumption that each user own one printer, but each user may own a plurality of printers.

The database 440 of the web print server 400 stores pieces of account information registered in the print service 420, information on the printers associated with the pieces of account information, and information on the application that uses the print service. In the present embodiment, the application that uses the print service is only the bot application server 300, but is not limited to this, and other applications may use the print service. The print service 420 functions as a job issuance unit that receives a print request from the bot application 310 of the bot application server 300, generates a print job, and sends the print job to the printer 500. The file storage 410 of the web print server 400 stores print job s each containing print data converted in a format processable by the printer 500 and information such as its path (URI).

The web application 430 has a function of providing web pages to the web browsers 120 and 620 of the client terminals 100 and 6000 or web browser 510 and 730 of the printers 500 and 720 to issue and display connect IDs in response to user operations. The web application 430 further has a function of receiving connect IDs input by the users by using the client apps 110 and 610 via the respective networks to verify whether the connect IDs are valid. Details of the connect IDs will be described later. The temporary storage database 450 is a database for the web application 430 to temporarily store the issued connect IDs and the like.

The printers 500 and 720 provided in the respective client systems 10 and 20 will be described. Since the printers 500 and 720 have the same configuration, the printer 500 will be described as an example.

The printer 500 includes the web browser 510. The printer 500 receives a print job notification from the print service 420 of the web print server 400. Following the content described in the print job notification, the printer 500 accesses the file storage 410 of the web print server 400, obtains a print job, and executes printing. The web browser 510 is an application that displays a web page. The web browser 510 displays a web page provided by a web application (not illustrated) of the bot application server 300, and receives operations from the user using the client terminal 100.

Figure 2:
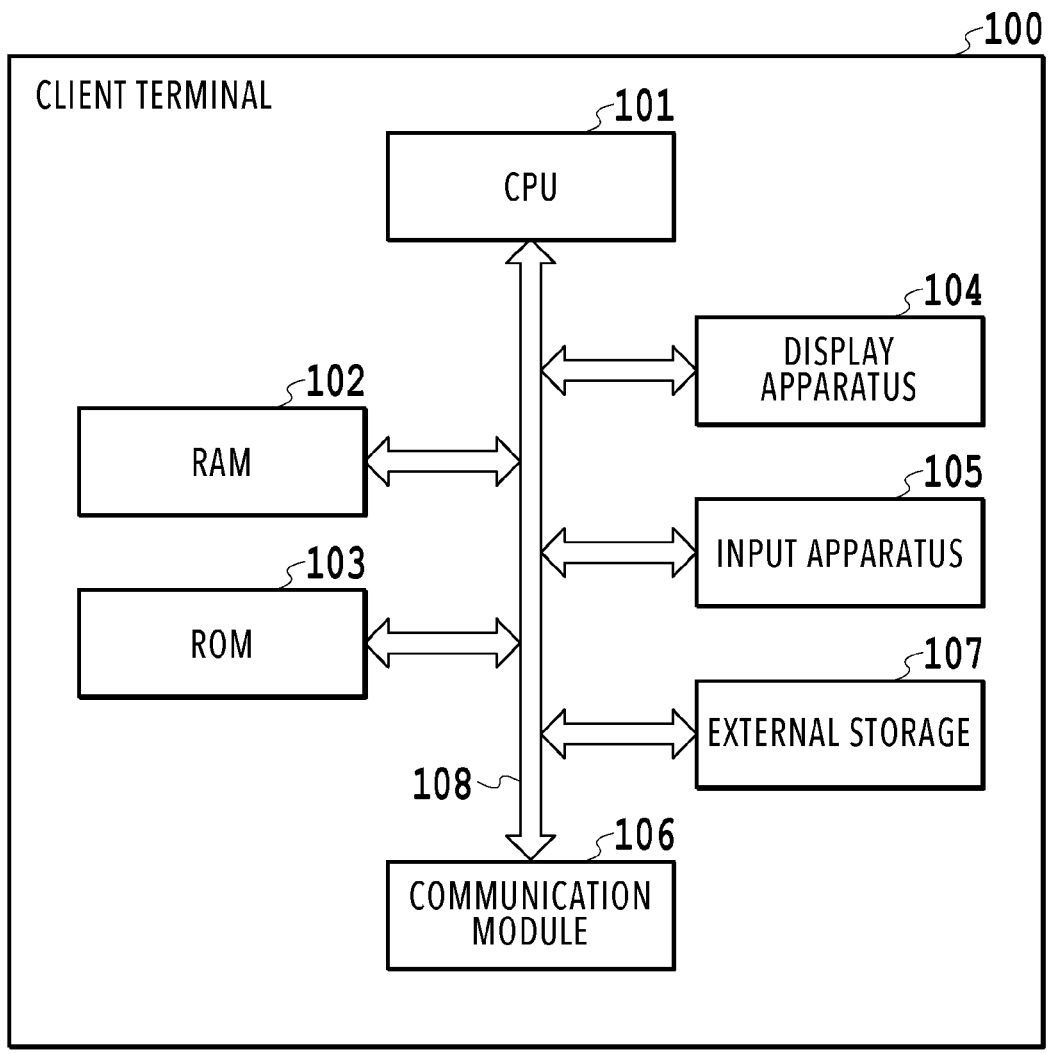
FIG. 2 is a diagram illustrating an example of the hardware configuration of a client terminal.

FIG. 2 is a diagram illustrating an example of the hardware configurations of the client terminals 100 and 6000 according to the present embodiment. Since the client terminals 100 and 6000 have similar configurations, the client terminal 100 will be described here as an example. The client terminal 100 includes a CPU 101, a RAM 102, a ROM 103, a display apparatus 104, an input apparatus 105, a communication module 106, and an external storage 107.

The CPU 101 performs computation of data and commands, determination, and control according to programs stored in the RAM 102 and the ROM 103. The RAM 102 is a volatile storage area and is used as a temporary storage area in a case where the CPU 101 performs various types of processing. The ROM 103 is a non-volatile storage area and stores an operating system (OS), the client app 110, the web browser 120, and other application software. The display apparatus 104 includes a liquid crystal display and a graphic controller, and displays web pages downloaded from servers, graphic user interfaces (GUIs), and the like. To display a web page, the web browser 120 downloads the web page into the RAM 102 and displays it on the display apparatus 104. In sum, processing to be performed in the client terminal 100 is implemented by the CPU 101 executing programs stored in the ROM 103.

The input apparatus 105 is an apparatus to be operated by the user to give various instructions to the client terminal 100 and is a keyboard, for example. The input apparatus 105 is also an apparatus that obtains images and is a camera, for example. Note that the input apparatus 105 is not limited to these, and may be an external component(s). The client terminal 100 receives various instructions given by the user via the input apparatus 105, and performs various types of control corresponding to the instructions.

The communication module 106 is an interface for communicating with external apparatuses each connected to a LAN cable or telephone line, for example. The communication module 106 connects to a communication instrument (not illustrated) such as a router and performs data communication with the video distribution system 200 and the bot application server 300 via the networks 1000. Note that this data communication may be performed wirelessly with a wireless enabled interface, for example. The external storage 107 is a non-volatile storage area. For example, a flash memory is generally used as the external storage 107 in a case where the client terminal 100 is a smartphone. A system bus 108 is used in data exchange inside the client terminal 100.

In FIG. 2, the display apparatus 104 and the input apparatus 105 of the client terminal 100 are illustrated individually. However, the present embodiment is not limited to this, and a touch panel display combining a display apparatus and an input apparatus, or the like may be employed. In this case, a camera, which is an image capturing apparatus, is provided separate from the touch panel display. Also, although one client terminal 100 is illustrated in FIG. 2, the client app according to the present embodiment is capable of sending and receiving messages between a plurality of client terminals. For example, the client terminal 100 is also capable of sending and receiving messages to and from the client terminal 6000 illustrated in FIG. 1. Also, although the example illustrated in FIG. 1 is an example in which the client terminals 100 and 6000 have the same configuration, the plurality of client terminals that send and receive messages to and from each other may have the same configuration or different hardware configurations.

Figure 3:
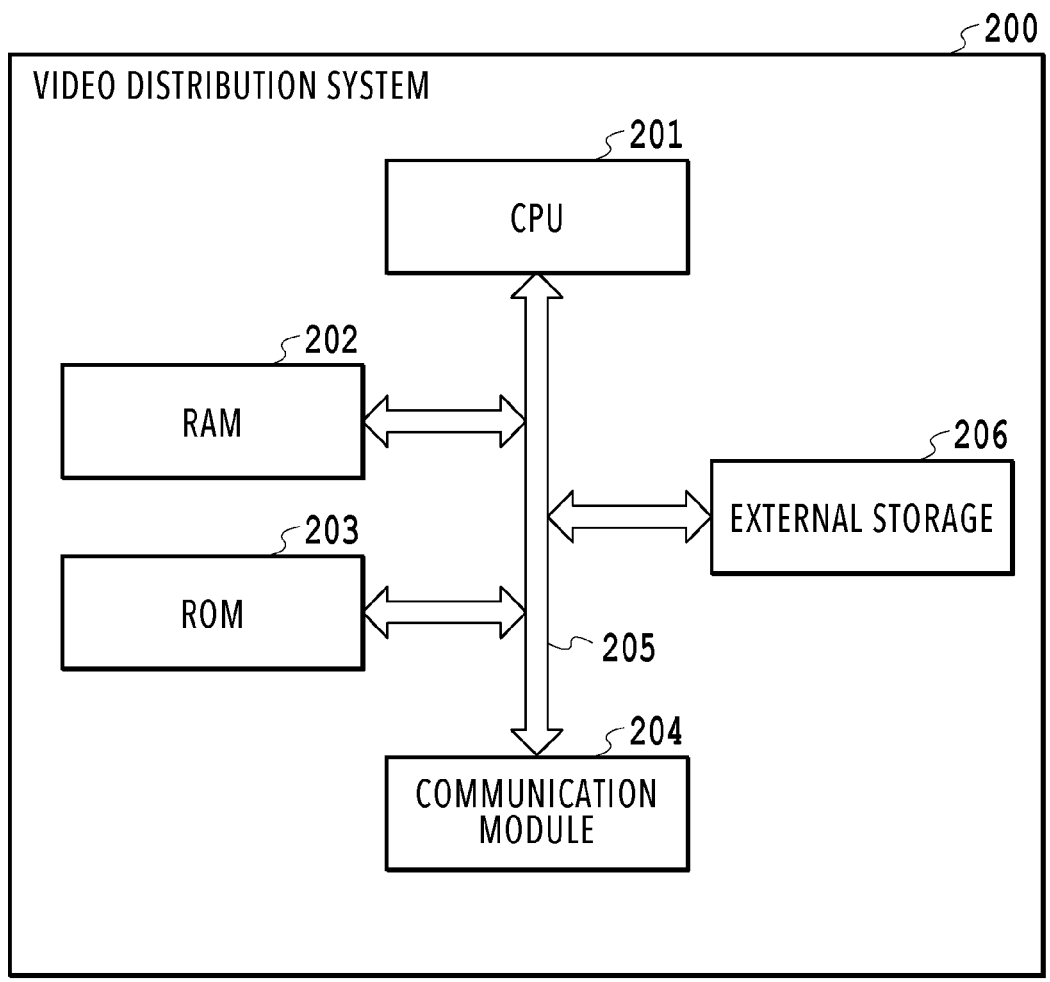
FIG. 3 is a diagram illustrating an example of the hardware configuration of a video distribution system.

FIG. 3 is a diagram illustrating an example of the hardware configuration of the video distribution system 200 according to the present embodiment. The video distribution system 200 includes a CPU 201, a RAM 202, a ROM 203, a communication module 204, and an external storage 206. Note that processing to be performed in the video distribution system 200 in the present embodiment is assumed to be executed by one server, but may be implemented by a plurality of servers cooperating with each other.

The CPU 201 performs computation of data and commands, determination, and control according to programs stored in the RAM 202 and the ROM 203. The RAM 202 is a volatile storage area and is used as a temporary storage area in a case where the CPU 201 performs various types of processing. The ROM 203 is a non-volatile storage area. The communication module 204 is an interface for communicating with external apparatuses each connected to a LAN cable, for example. The communication module 204 connects to a communication instrument (not illustrated) such as a router and performs data communication with the client terminal 100 and the bot application server 300 via the networks 1000. Note that this data communication may be performed wirelessly with a wireless enabled interface, for example. The external storage 206 stores various pieces of data such as an operating system (OS) and applications. A system bus 205 is used in data exchange inside the video distribution system 200. In sum, processing to be performed in the video distribution system 200 is implemented by the CPU 201 executing programs stored in the ROM 203.

The hardware configurations of the bot application server 300 and the web print server 400 are similar to that of the video distribution system 200 described above, and detailed description thereof is omitted. Note that these servers are not limited to the above-described configuration. For example, they may have the configuration of a common information processing apparatus and may each have a different configuration.

Figure 4:
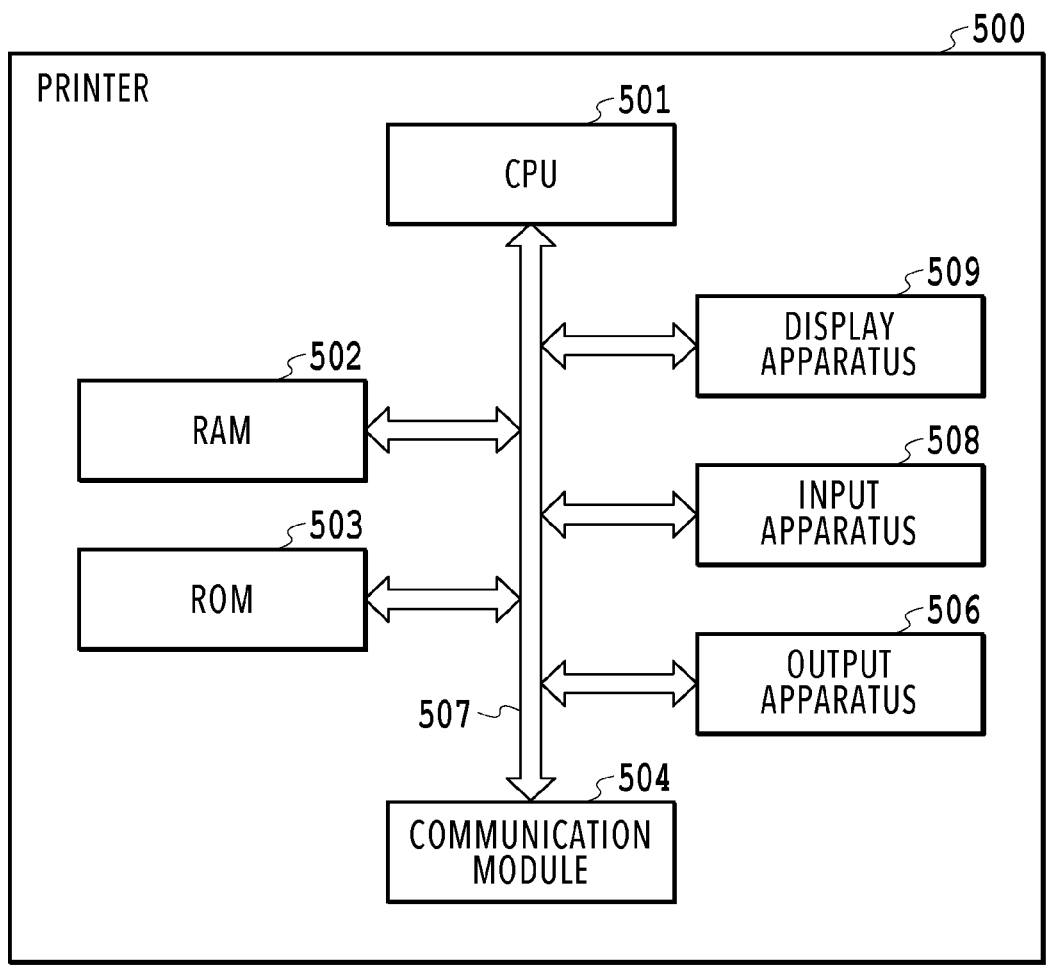
FIG. 4 is a diagram illustrating an example of the hardware configuration of a printer.

FIG. 4 is a diagram illustrating an example of the hardware configurations of the printers 500 and 720 according to the present embodiment. Since the printers 500 and 720 are similar, the hardware configuration of the printer 500 will be described here. The printer 500 includes a CPU 501, a RAM 502, a ROM 503, a communication module 504, an output apparatus 506, an input apparatus 508, and a display apparatus 509.

The CPU 501 performs computation of data and commands, determination, and control according to programs stored in the RAM 502 and the ROM 503. The RAM 502 is a volatile storage area and is used as a temporary storage area in a case where the CPU 501 performs various types of processing. The ROM 503 is a non-volatile storage area and stores an operating system (OS), the web browser 510, and other application software. Also, the ROM 503 may be a data-rewritable non-volatile memory, such as represented by a flash memory. The communication module 504 is an interface for communicating with an external apparatus connected to a LAN cable, for example. The communication module 504 connects to a communication instrument (not illustrated) such as a router and performs data communication with the web print server 400 via the network 1200. Note that this data communication may be performed wirelessly with a wireless enabled interface, for example. In sum, processing to be performed in the printer 500 is implemented by the CPU 501 executing programs stored in the ROM 503.

The output apparatus 506 is an apparatus that forms an image on a print sheet (print medium), such as paper, and is a printing unit, for example. The input apparatus 508 is a panel to be operated by the user to give various instructions to the printer 500 and is a set of hardware keys, for example. The display apparatus 509 displays graphic user interfaces (GUIs) and the like. The display apparatus 509 may be a full-color liquid crystal display or include a smaller number of LEDs. Note that a touch panel display combining the input apparatus 508 and the display apparatus 509 or the like may be used. Through a system bus 507, data are exchanged between components included in the printer 500.

As mentioned above, the printer 500 according to the present embodiment is assumed to be a network printer capable of communicating with an external apparatus via a network. The configuration of the printer 500 according to the present embodiment is not limited to the above-described configuration, and may further include components corresponding to its functions. For example, a multi-function peripheral (MFP) may be used as the printer 500. Also, in the present embodiment, an example has been presented in which the printer 500 and the printer 720 having similar functions thereto are provided in the system. However, each printer may have different functions.

[Processing Sequence]
(Connect ID Issuance Processing)

Figure 5:
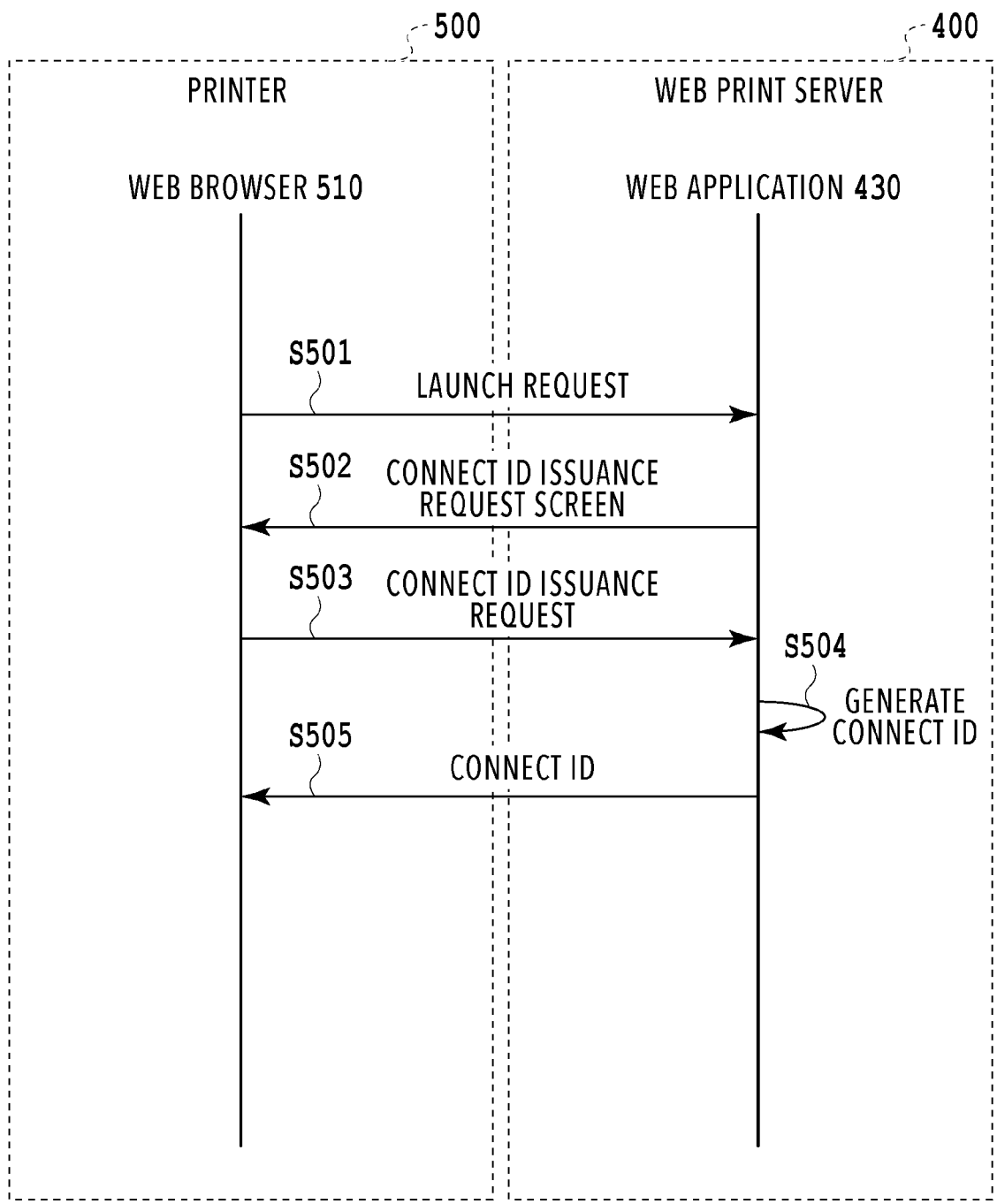
FIG. 5 is a sequence chart illustrating connect ID issuance processing.
Figure 7A:
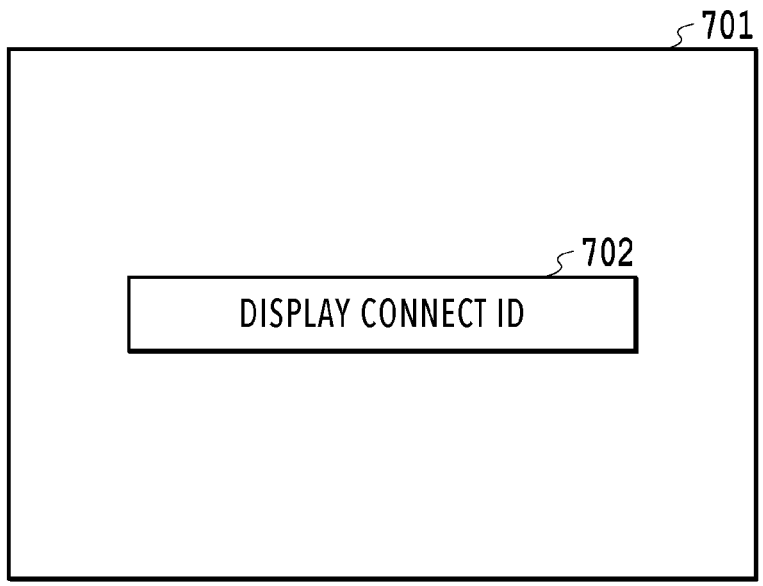
FIGS. 7A and 7B are diagrams illustrating an example of screens for the connect ID issuance processing.
Figure 7B:
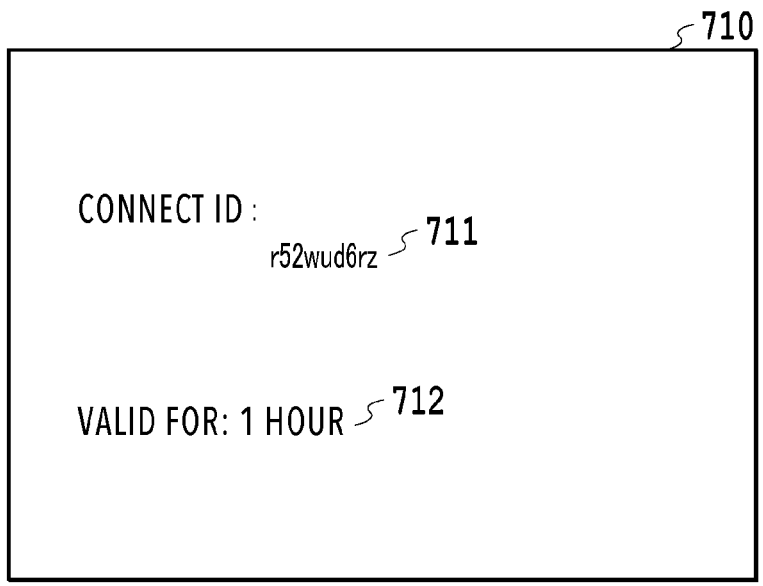

FIG. 5 is a sequence chart illustrating processing of issuing a connect ID of a printer in the present embodiment. Also, FIGS. 7A and 7B illustrate an example of screens of the web application 430 related to the connect ID issuance processing. Note that in this processing sequence, the processing is executed similarly for the printer 500 and for the printer 720. Thus, the processing of issuing the connect ID of the printer 500 will be described here as an example.

In S501, in response to receiving a launch instruction by a user operation for issuing a connect ID, the web browser 510 of the printer 500 sends a launch request to the web application 430 of the web print server 400.

In S502, the web application 430 returns a connect ID issuance request screen 701 illustrated in FIG. 7A as a response to the launch request.

Based on the response in S502, the web browser 510 displays the connect ID issuance request screen 701 on the display apparatus 509. Then, in response to receiving an issuance instruction by a user operation via an issuance request button 702 in the connect ID issuance request screen 701, the web browser 510 sends a connect ID issuance request to the web application 430 (S503). This connect ID issuance request contains a printer ID being a unique identifier (second identification information) in the print service allocated to the printer 500, and printer model information.

In S504, in response to receiving the connect ID issuance request, the web application 430 searches the database 440 based on the printer ID contained in the request to thereby determine whether this printer ID has been registered. If the printer ID has not been registered, the web application 430 issues a random value with a fixed number of digits as a connect ID. Note that the user may register the printer ID in the web print server 400 in advance prior to requesting a connect ID. The connect ID will be used as authentication information for registering the printer. Further, the web application 430 records the issued connect ID, the printer ID, the printer information obtained from the database 440 with the printer ID as a key, and the expiry date and time of the connect ID in the temporary storage database 450. A description will be given here by taking an example in which a 9-digit random value is generated as the connect ID. However, the connect ID is not limited to this, and the method of generating the random value is not particularly limited either. Moreover, a preset value may be used as the expiry date and time of the connect ID, or a period from a predetermined timing may be used.

FIG. 6 illustrates an example of the configuration of a connect ID management table 600 managed in the temporary storage database 450 in the present embodiment. In the connect ID management table 600, connect IDs, printer IDs, printer models, and expiry dates and times are managed in association with each other. Note that in FIG. 6 two connect IDs ("amskri6ej" and "abdbdc612") are managed under the same printer ID ("05001"). This is because a connect ID has been issued twice to one printer. For example, in a case where the user operates the printer 500 to request a connect ID for the bot application 310, a connect ID is issued for the bot application 310 (for the bot application server 300). In a case where the user then operates the printer 500 to request a connect ID for another bot application, another connect ID is issued for this other bot application (another bot application server). As a result, two connect IDs are issued to the same printer. Note that, to handle such processing, application IDs (BOT0001, BOT0002, etc.), which are not contained in FIG. 6, may further be managed in the table in FIG. 6. In the present embodiment, in a case where a connect ID has expired, a different connect ID is issued even if the user is the same. Note that the configuration may be such that, in a case where the same user requests issuance of a connect ID again before the expiry date and time, a different connect ID is issued (the connect ID is updated). Alternatively, the configuration may be such that, in a case where the same user requests issuance of a connect ID again before the expiry date and time, only the expiry date and time are updated.

In S505, the web application 430 returns a connect ID display screen 710 of a web page containing the connect ID generated in S504 to the web browser 510 as a response to the connect ID issuance request. As illustrated in FIG. 7B, the connect ID display screen 710 is configured to display information of a connect ID 711 and its expiry date and time 712. Note that the connect ID display screen 710 may further contain information on the printer.

Figure 8:
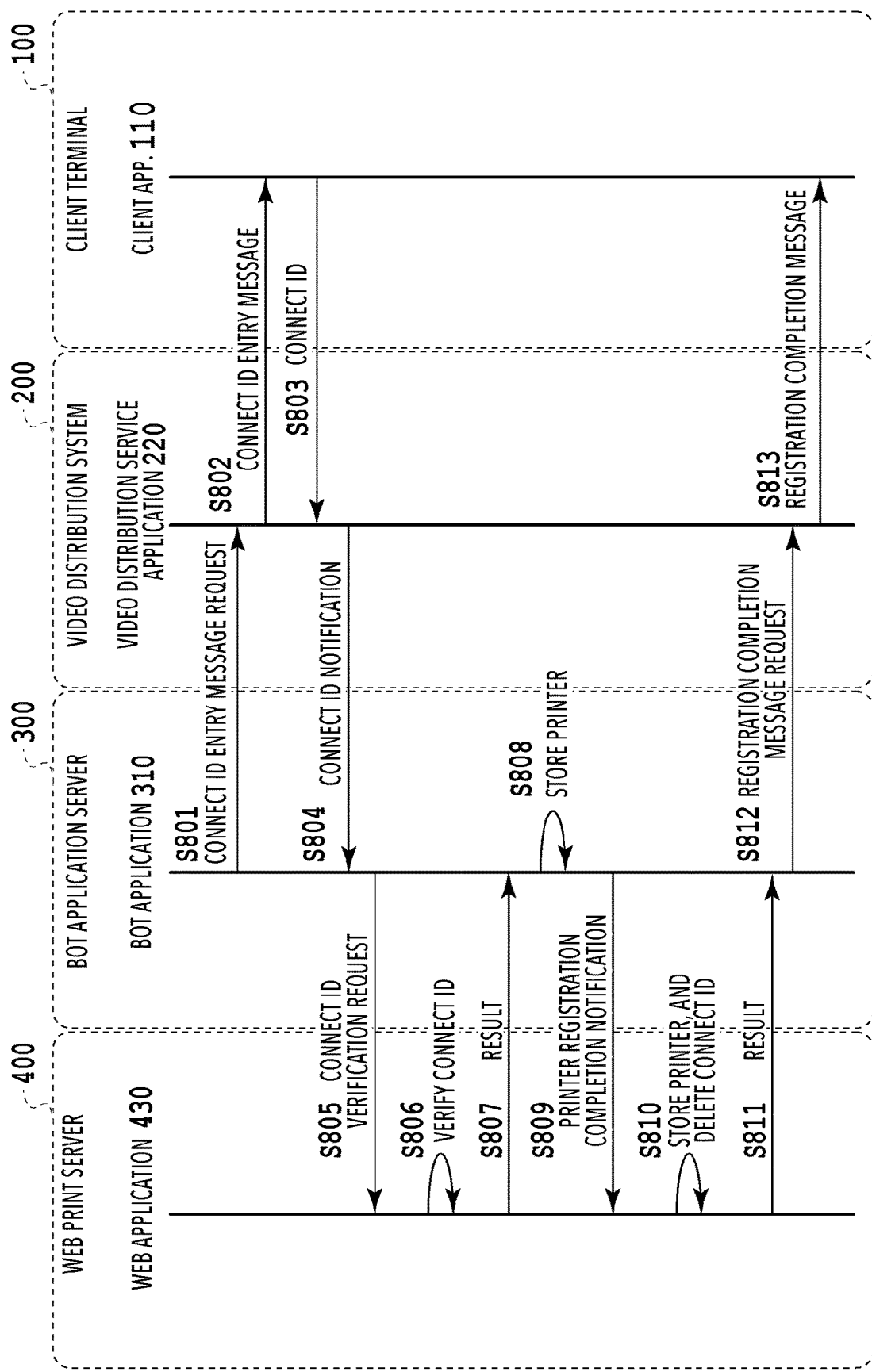
FIG. 8 is a sequence chart illustrating registration processing.

FIG. 8 is a sequence chart illustrating registration processing to be executed by the client system 10 (or 20) in the present embodiment. Processing of registering the client app 110 and the printer 500 in the client system 10 will be representatively described here.

The sequence illustrated in FIG. 8 starts, for example, in a case where the user requests the registration processing from the client terminal 100. FIGS. 9A to 9C are examples of a message talk screen of the client app 110 related to the registration processing in the present embodiment. In a message talk screen 1410 provided by the client app 110, messages and files sent from the user and a message talk partner are displayed in chronological order from the top. Note that this message talk screen 1410 is displayed as one region in a later-described video viewing screen 1450 illustrated in FIG. 14. In the message talk screen 1410 in FIGS. 9A to 9C, balloons from the left of the screen represent messages and images sent from the talk partner whereas balloons from the right of the screen represent messages and images sent from the user of the client app 110. In the examples of FIGS. 9A to 9C, the talk partner is the bot application 310 as a virtual user and is displayed as "Print Bot User" here. Also, the talk partner is displayed as "Print Bot" in its icons on the left of the screen.

The user launches the client app 110 and selects "Print Bot User" as a talk partner to display a message exchange screen (the screen in each of FIGS. 9A to 9C). At this time, the video distribution app 220 sends the bot application 310 an event indicating that the talk screen has been displayed. In the case where this event is sent, the bot application 310 notifies the client app 110 of a message containing a choice about whether to execute the registration processing, via the video distribution app 220. If the user chooses to execute the registration processing by operating the client app 110, S801 in FIG. 8 is started.

In S801, the bot application 310 sends a connect ID entry message request to the video distribution app 220.

In S802, in response to receiving the connect ID entry message request, the video distribution app 220 sends a connect ID entry message to the client app 110. In response to receiving the connect ID entry message, the client app 110 displays a connect ID entry message 901 in the talk screen, as illustrated in FIG. 9A. The content of the connect ID entry message 901 is not particularly limited, and is displayed according to the content of the message received from the client app 110.

Assume that, as illustrated in FIG. 9A, the user enters a connect ID ("r52wud6rz" in this example) as a message 902 from the client app 110 on the client terminal 100. After entering the connect ID, the user issues an instruction to send the connect ID. As a result, in S803, the client app 110 sends the entered connect ID to the video distribution app 220. Note that, in S803, identification information (first identification information) given to the client app 110 to make it identifiable and user identification information on the client app 110 are sent along with the connect ID.

In S804, the video distribution app 220 sends a notification containing the information received from the client app 110 to the bot application 310. Specifically, the video distribution app 220 sends a notification containing the connect ID, the identification information on the client app 110, or the sender of the message in S803, and the user identification information on the client app 110, all of which have been received from the client app 110, to the bot application 310. This identification information on the client app 110 is information unique to the client app 110. Also, in a case where the client app 110 is configured to require the user to log in to use it, this identification information may be identification information unique to the user who is to log in. In the present embodiment, the user (hereinafter also referred to as "client user") is allowed to use the video distribution service by logging in to this service via the login screen illustrated in FIG. 11.

In S805, the bot application 310 issues a request to verify the connect ID contained in the notification received in S804 to the web application 430. This verification request contains at least the connect ID entered in S803 and an application ID allocated to the bot application 310 by the print service 420. The following description will be given on the assumption that the application ID allocated to the bot application 310 is "BOT0001".

In S806, the web application 430 verifies the connect ID indicated in the verification request by referring to the connect ID management table 600 (FIG. 6) stored in the temporary storage database 450. Specifically, the web application 430 determines whether the connect ID indicated in the verification request is present in the connect ID management table 600 and also has not expired. If these conditions are met, the web application 430 determines that the connect ID is valid and legitimate. Here, if the connect ID has expired, the web application 430 deletes this connect ID in the connect ID management table 600. Note that application IDs may also be managed in FIG. 6, as mentioned earlier. The processing of S806 in this case will be described. The web application 430 may determine whether the application ID (e.g., BOT001) and the connect ID indicated in the verification request in S805 are present in the same record in the connect ID management table 600 in FIG. 6 and also have not expired.

In S807, the web application 430 returns the result of the verification in S806 to the bot application 310 as a response to the verification request. If the connect ID is valid, the web application 430 returns printer information retrieved from the temporary storage database 450 such as the printer ID and the printer model name to the bot application 310 along with the verification result. If, on the other hand, the connect ID is invalid, the bot application 310 discontinues the registration processing and requests the video distribution app 220 to send a registration error message to the client app 110. In this case, as illustrated in FIG. 9B, the client app 110 displays a registration error message 904.

In S808, the bot application 310 is notified that the connect ID was valid in S807. In response to this notification, the bot application 310 stores the received printer ID and printer information (model name) and the identification information and user identification information on the client app 110 received in S804 in association with one another in the database 330. Note that an example of a management table provided in the database 330 will be described later using FIG. 10A. Here, if the same set of client app identification information and printer ID has already been registered in a management table, the bot application 310 sends a message indicating that the registration has already been done to the client app 110 via the video distribution app 220. In this case, the client app 110 displays a message 905 indicating that the registration has already been done in the talk screen, as illustrated in FIG. 9C.

In S809, the bot application 310 sends a registration completion notification to the web application 430. This notification contains at least the connect ID and the application ID of the bot application 310.

In response to receiving the registration completion notification, the web application 430 stores the printer ID and the application ID of the bot application in the database 440 (S810). Specifically, from the connect ID management table 600 in FIG. 6, the web application 430 obtains the printer ID corresponding to the connect ID contained in the registration completion notification in S809. The web application 430 then stores the printer ID obtained from the connect ID management table 600 and the application ID of the bot application contained in the registration completion notification in the database 440 (management table 1002 (FIG. 10B)). Here, the configuration of the management table, which is provided in the database 440, will be described later using the management table 1002 in FIG. 10B. Further, the web application 430 deletes the connect ID from the connect ID management table 600 (FIG. 6) in the temporary storage database 450.

In S811, the web application 430 notifies the bot application 310 of the result of the registration.

In S812, in response to receiving the result of the registration, the bot application 310 sends a registration completion message request to the video distribution app 220.

In S813, in response to receiving the registration completion message request, the video distribution app 220 sends a registration completion message to the client app 110. In response to receiving the registration completion message, the client app 110 displays a registration completion message 903 in the talk screen, as illustrated in FIG. 9A. This sequence is then terminated.

FIGS. 10A to 10I are diagrams illustrating an example of management tables according to the present embodiment. A management table 1001 illustrated in FIG. 10A holds the identification information (User ID) on each client app 110, the client user name of the client app 110, and the printer ID and the model name of the corresponding printer in association with one another. The management table 1001 is stored in the database 330 of the bot application server 300. For example, the management table 1001 is updated in S808 in FIG. 8. Note that in S808, if there is matching client app identification information in the management table 1001, the record corresponding to that identification information may be deleted from the management table 1001 and the registration processing may be continued, or the registration may be discontinued. Also, duplication of user identification information may be permitted to enable registration of a plurality of printers.

The management table 1002 illustrated in FIG. 10B holds application IDs and printer IDs in association with each other. The management table 1002 is stored in the database 440 of the web print server 400 in S810 in FIG. 8. Note that basically the same processing as that in FIG. 8 is executed in a case where the user performs processing of registering another bot application different from the bot application 310 and the printer 500. Thus, in a case where the user executes the processing of FIG. 8 for another bot application, for example, the application ID corresponding to this other bot application (e.g., BOT0002) and the entered printer ID will be managed in the management table 1002.

A management table 1003 illustrated in FIG. 10C holds pieces of identification information (user IDs), passwords, client user names, grades, and printed study material content IDs in association with one another. The management table 1003 is stored in the database 230 of the video distribution system 200.

A management table 1004 in FIG. 10D holds class IDs, dates and times, grades, subjects, teachers, video content IDs, and study material content IDs and distribution times in association with one another. The management table 1004 is stored in the database 230 of the video distribution system 200.

A management table 1005 in FIG. 10E holds study material content IDs, files, titles, descriptions, numbers of pages, and prices in association with one another. Each file stores information of the file name of a study material content and the path (URI) to the area storing the file. The management table 1005 is stored in the database 230 of the video distribution system 200.

A management table 1006 in FIG. 10F holds video content IDs, files, titles, descriptions, and teachers in association with one another. Each file stores information of the file name of a video content and the path (URI) to the area storing the file. Note that a case where data "Live" is stored as the file represents a case where the online class is not a recorded class but is to be distributed live. The management table 1006 is stored in the database 230 of the video distribution system 200.

A management table 1007 in FIG. 10G holds pieces of identification information (user IDs), classes, tuitions (monthly), and study material fees in association with one another. The management table 1007 is stored in the database 5100 of the accounting system 5000.

A management table 1008 in FIG. 10H holds print request IDs, print settings, pieces of identification information (user IDs), files, study material content IDs, application IDs, and printer IDs in association with one another. Each file stores information of the file name of a study material content and the path (URI) to the area storing the file. The management table 1008 is stored in the database 330 of the bot application server 300.

A management table 1009 in FIG. 10I holds print job IDs, print settings, files, pieces of identification information (user IDs), study material content IDs, pieces of print data, and print results and numbers of pages printed in association with one another. Each file stores information of the file name of a study material content and the path (URI) to the area storing the file. The management table 1009 is stored in the database 440 of the web print server 400.

Through the procedure described above, the users using the client systems 10 and 20 register the respective printers 500 and 720 with their own user accounts for the respective client apps. By this user operation, in the present embodiment, pieces of information on the printers are stored in association with the respective client user names, as described in the management table 1001 in FIG. 10A. For example, information on the printer 500 is stored in association with a client user name "Natsu Abe", and information on the printer 720 is stored in association with another client user name "Koichi Osaka".

Figure 11:
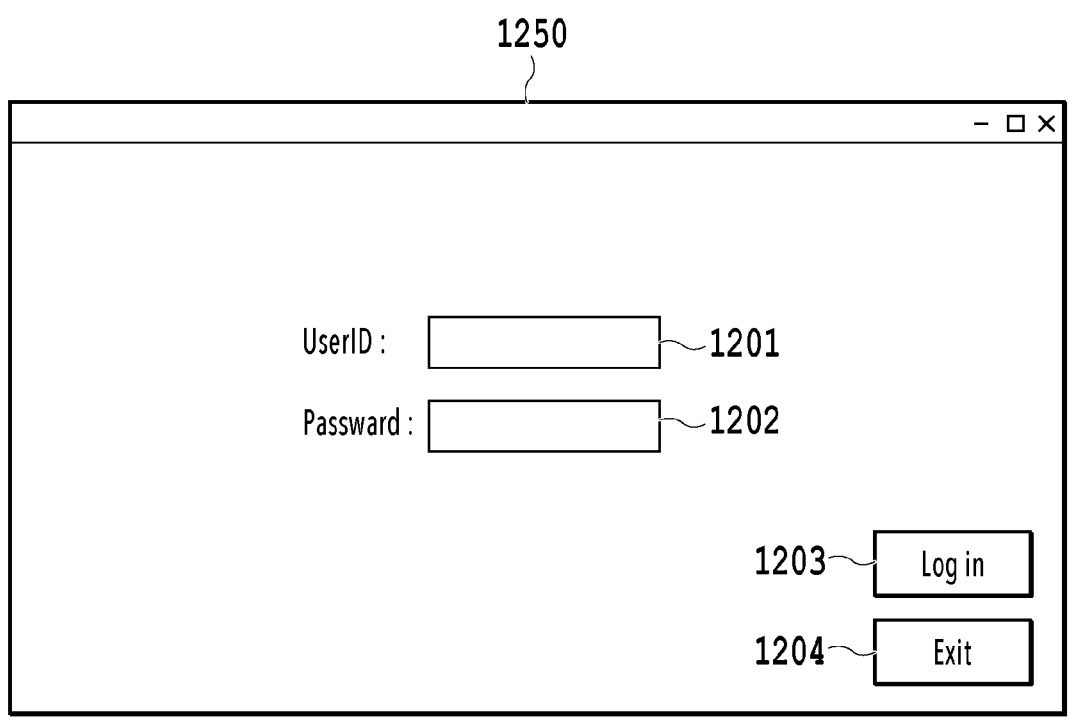
FIG. 11 is a diagram illustrating an example of a login screen.

Next, an example of screens of the client app 110 (or 610) in the present embodiment will be described using FIGS. 11 and 12. FIG. 11 is a diagram illustrating an example of a login screen. A login screen 1250 is provided by the client app 110 (or 610). This login screen 1250 is provided with a user ID entry portion 1201 for the client user to enter his or her user ID, and a password entry portion 1202 for the client user to enter his or her password. The login screen 1250 is further provided with a log in button 1203 for logging in to the video distribution service, and an exit button 1204 for logging out of the video distribution service.

The client user needs to log in to the video distribution service in a case of participating in an online class. For example, for the client user "Natsu Abe" to participate in an online class, the client user enters "C0001" in the user ID entry portion 1201 and "Kirachu" in the password entry portion 1202 and presses the log in button 1203. In response to pressing the log in button 1203, the client app 110 sends the user ID "C0001" and the password "Kirachu" to the video distribution app 220. The video distribution app 220 refers to the management table 1003 in FIG. 10C and performs authentication on the combination of the user ID and the password. If the combination of the user ID and the password is determined as being correct and the authentication therefore succeeds, the video distribution app 220 permits the client user Natsu Abe to log in to the video distribution service. The client user Natsu Abe can now participate in the online class.

Figure 12:
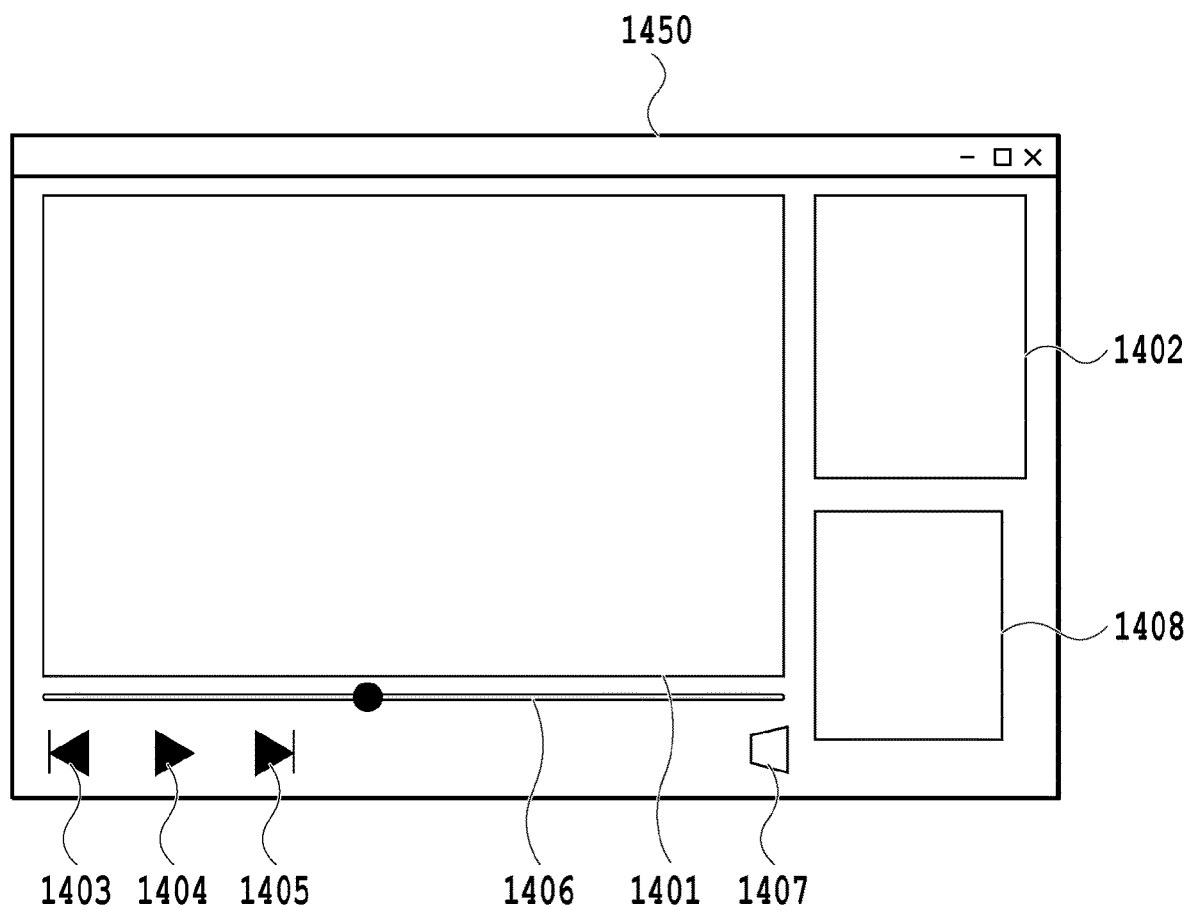
FIG. 12 is a diagram illustrating an example of a video viewing screen.

FIG. 12 is a diagram illustrating an example of a video viewing screen. The video viewing screen 1450 is provided by the client app 110 (or 610) and the video distribution app 220. A region 1401 is a video display portion for a video content distributed from the video distribution app 220. In a region 1402 is displayed a message talk screen to display messages exchanged between the bot application 310 and the client user. For example, one of the screens in FIGS. 9A to 9C or FIGS. 16A to 16D is displayed in the region 1402. A button 1403 is a button having a function of skipping back to the immediately previous video content. A button 1404 is a play button having a function of reproducing a video content. A button 1405 is a forward button having a function of skipping to the next video content. A slider 1406 indicates the position of reproduction of a video content, and the user can change the position of reproduction of the video content by designating a position from which to reproduce the video content. A volume 1407 is a volume controller to adjust the sound volume of a speaker (not illustrated) and, in response to the client user pressing this, a slider (not illustrated) is displayed, and the sound volume can be adjusted by adjusting the position of the slider. A region 1408 is a notification display portion to display a notification from the video distribution app 220. Next, an example of screens to be operated by the administrator of the video distribution service in the present embodiment will be described using FIGS. 13 and 14. FIG. 13 is a diagram illustrating an example of an online class management screen. An online class management screen 1550 is provided by the video distribution app 220. The administrator of the video distribution service can open and operate this online class management screen 1550 on a web browser (not illustrated) installed in a PC (not illustrated). FIG. 13 illustrates an example in which two classes with class IDs "A00101" and "B00104" have been registered. In each of video content information display portions (class description display portions) 1501 and 1511, the file name or description of a video content is displayed. The video distribution app 220 refers to the management table 1006 in FIG. 10F and displays information on the video contents in the respective video content information display portions 1501 and 1511.

The class with the class ID "A00101" is an online class using a video content being a file with a file name "file1.mp4". The class with the class ID "B00104" is an online class to be distributed live. In class description display portions 1502 and 1512, descriptions of the respective online classes are displayed such as the dates and times of the classes, the grades of target attenders, the subjects, and the teachers. Here, the video distribution app 220 refers to the management table 1004 in FIG. 10D to obtain the descriptions of the classes, and displays the obtained descriptions in the class description display portions 1502 and 1512. In study material content information display portions 1504, 1507, and 1514, the file names of study material contents are displayed. Here, the video distribution app 220 refers to the management table 1005 in FIG. 10E to obtain the file names of the study material contents and displays the obtained file names in the study material content information display portions 1504, 1507, and 1514. In study material content description display portions 1505, 1508, and 1515, descriptions of the study material contents such as the titles and prices of the study material contents are displayed. Here, the video distribution app 220 refers to the management table 1005 in FIG. 10E and displays the descriptions of the study material contents in the study material content description display portions 1505, 1508, and 1515.

Moreover, class deletion buttons (Delete) 1503 and 1513 are buttons for deleting the registered classes. The administrator of the video distribution service can delete the registered classes by pressing these buttons. For example, in a case where the administrator of the video distribution service presses the class deletion button 1503 in FIG. 13, the video distribution app 220 deletes the class with the class ID "A00101" from the management table 1004 in FIG. 10D. Accordingly, the class with the class ID "A00101" stops being displayed in the online class management screen 1550. Also, in a case where the administrator of the video distribution service presses the class deletion button 1513, the video distribution app 220 deletes the class with the class ID "B00104" from the management table 1004. Accordingly, the class with the class ID "B00104" stops being displayed in the online class management screen 1550. This makes it impossible for the user of the client terminal 100 or the client terminal 6000 to attend the deleted class (e.g., the class with the class ID "B00104").

Moreover, study material content deletion buttons 1506, 1509, and 1516 are buttons for deleting the study material contents. By pressing these buttons, the administrator of the video distribution service can delete the study material contents registered in association with the classes (class IDs) from those classes. For example, in a case where the administrator of the video distribution service presses the study material content deletion button 1506 in FIG. 13, the video distribution app 220 deletes the study material content with a study material content ID "A002" among the study material content IDs in the management table 1004. Accordingly, the study material content with the study material content ID "A002" stops being displayed in the online class management screen 1550. This makes it impossible for the user of the client terminal 100 or the client terminal 6000 to refer to or print the deleted study material content (e.g., the study material content with the study material content ID "A002").

Further, in a case where the administrator of the video distribution service presses the study material content deletion button 1509, the video distribution app 220 deletes the study material content with a study material content ID "A003" among the study material content IDs in the management table 1004. Accordingly, the study material content with the study material content ID "A003" stops being displayed in the online class management screen 1550. Furthermore, in a case where the administrator of the video distribution service presses the study material content deletion button 1516, the video distribution app 220 deletes the study material content with a study material content ID "B002" among the study material content IDs in the management table 1004. Accordingly, the study material content with the study material content ID "B002" stops being displayed in the online class management screen 1550.

Also, study material content addition buttons 1510 and 1517 are buttons for adding study material contents. By pressing these buttons 1510 and 1517, the administrator of the video distribution service can add study material contents in association with the classes (class IDs). For example, in a case where the administrator of the video distribution service presses the study material content addition button 1510 in FIG. 13, the video distribution app 220 displays a study material content addition screen (not illustrated). By operating this study material content addition screen, the administrator of the video distribution service can add a study material content in association with the class with the class ID "A00101". According to the operation by the administrator of the video distribution service, the video distribution app 220 updates the management table 1004 in FIG. 10D and the management table 1005 in FIG. 10E. This makes it impossible for the user of the client terminal 100 or the client terminal 6000 to refer to or print the deleted study material content (e.g., the study material content with the study material content ID "A002").

Further, in a case where the administrator of the video distribution service presses the study material content addition button 1517, the video distribution app 220 displays the study material content addition screen (not illustrated). By operating this study material content addition screen, the administrator of the video distribution service can add a study material content in association with the class with the class ID "B00104". According to this operation by the administrator of the video distribution service, the video distribution app 220 updates the management table 1004 in FIG. 10D and the management table 1005 in FIG. 10E.

The online class management screen 1550 is further provided with a class addition button 1518. By pressing this class addition button 1518, the administrator of the video distribution service can add a class. Specifically, in a case where the administrator of the video distribution service presses the class addition button 1518, the video distribution app 220 displays a class addition screen (not illustrated). By operating this class addition screen, the administrator of the video distribution service can add a class. Then, according to the operation by the administrator of the video distribution service, the video distribution app 220 updates the information stored in the management table 1004 in FIG. 10D, the management table 1005 in FIG. 10E, and the management table 1006 in FIG. 10F.

FIG. 14 is a diagram illustrating an example of an online class attender management screen. An online class attender management screen 1650 is provided by the video distribution app 220, and the administrator of the video distribution service can open and operate this screen on the web browser (not illustrated) installed in the PC (not illustrated).

FIG. 14 illustrates an example in which two attenders Natsu Abe with the user ID "C0001" and Koichi Osaka with a user ID "C0673" have been registered. In name display portions 1601 and 1607, the names of the online class attenders are displayed, respectively. Here, the video distribution app 220 refers to the management table 1003 in FIG. 10C to obtain the names of the two online class attenders and displays the obtained names of the two in the name display portions 1601 and 1607, respectively.

In user ID display portions 1602 and 1608, the user IDs of the online class attenders are displayed. Here, the video distribution app 220 refers to the management table 1003 in FIG. 10C to obtain the user IDs of the two online class attenders, and displays the obtained user IDs in the user ID display portions 1602 and 1608, respectively.

In grade display portions 1603 and 1609, the grades of the online class attenders are displayed. Here, the video distribution app 220 refers to the management table 1003 in FIG. 10C to obtain the grades of the two online class attenders, and displays the obtained grades in the grade display portions 1603 and 1609.

In timetable display portions 1604 and 1610, the timetables of the online class attenders are displayed. Here, the video distribution app 220 refers to a management table (not illustrated) in which the timetable of each online class attender is managed, to obtain the timetables of the two online class attenders, and displays the obtained timetables in the timetable display portions 1604 and 1610.

Edit buttons 1605 and 1611 are buttons to be used in a case of editing management information on the online class attenders. By pressing these buttons, the management information on the online class attenders displayed in the portions 1601 to 1604 and 1607 to 1610 can be edited. For example, in a case where the administrator of the video distribution service presses the edit button 1605, it enables an edit mode in which the management information on Natsu Abe with the user ID "C0001" is editable. In this edit mode, the administrator of the video distribution service can edit the contents in the portions 1601 to 1604. Then, in response to pressing a registered content update button (not illustrated) after the edit, the video distribution app 220 stores the set values at this point in the corresponding management tables.

Also, in a case where the administrator of the video distribution service presses the edit button 1611, it enables an edit mode in which the management information on Koichi Osaka with the user ID "C0673" is editable. In this edit mode, the administrator of the video distribution service can edit the contents in the portions 1607 to 1610. Then, in response to pressing a registered content update button (not illustrated) after the edit, the video distribution app 220 stores the set values at this point in the corresponding management tables.

Delete buttons 1606 and 1612 are buttons for deleting information on the online class attenders. For example, in a case where the administrator of the video distribution service presses the delete button 1606, the video distribution app 220 deletes information on Natsu Abe with the user ID "C0001" from the related management tables. Also, in a case where the administrator of the video distribution service presses the delete button 1612, the video distribution app 220 deletes information on Koichi Osaka with the user ID "C0673" from the related management tables.

An attender addition button 1613 is a button for adding an online class attender. By pressing this attender addition button 1613, the administrator of the video distribution service can add an online class attender. In a case where the administrator of the video distribution service presses the attender addition button 1613 in FIG. 14, the video distribution app 220 displays an attender addition screen (not illustrated). Then, by operating this attender addition screen, the administrator of the video distribution service can add an online class attender. According to the operation by the administrator of the video distribution service, the video distribution app 220 updates information stored in the related management tables.

(Print Processing)

Figure 15B:
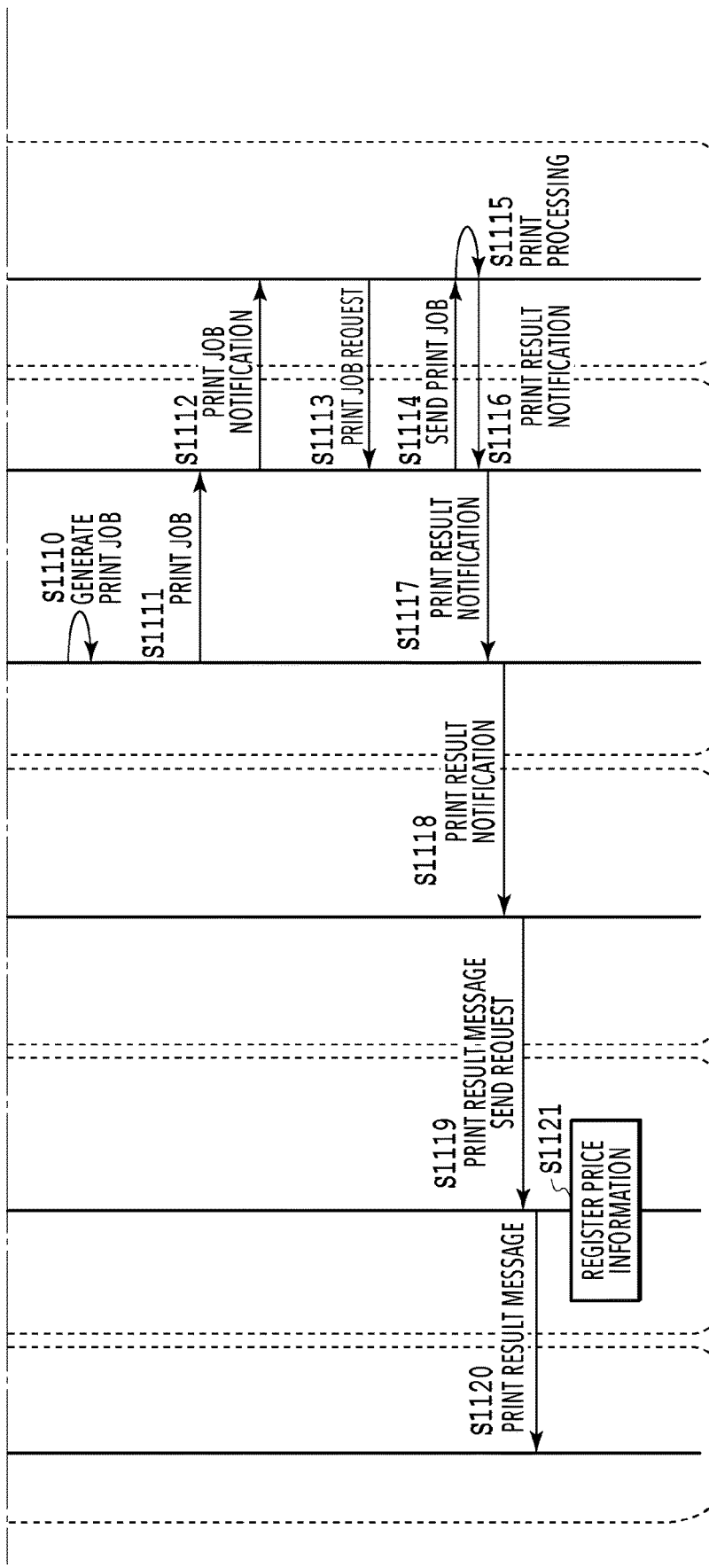

FIGS. 15A and 15B are sequence charts illustrating processing in which a user (client user) participating in an online class prints its study material content with the printer which the client user uses, i.e., the printer included in the client system which the client user is using.

In S1101, the video distribution app 220 distributes the video of the online class. For example, in the case where the class is grade-8 mathematics with the class ID A00101 in the management table 1004, the video distribution app 220 distributes a video with a video content ID A001 from 17:00 to 17:50 on Dec. 28, 2017.

Also, in S1102, the video distribution app 220 also functions as a notification unit that notifies the user of notification information indicating that there is a printable study material content while distributing the video. This notification information contains a study material content ID. Examples of this notification information on the study material content include the following:

[Notification example 1] "You can print Grade-8 Mathematics Review Exercise Book 2 (A002)."

[Notification example 2] "You can print Grade-8 Mathematics Preparation Exercise Book 2 (A003)."

[Notification example 3] "You can print Grade-12 English Advanced Exercise Book 3 (B002) (Price: ¥10,000 per book)."

A description will be given of a case where the class distributed in S1101 is the grade-8 mathematics class with the class ID A00101. In this case, based on the study material content IDs and the distribution times, the video distribution app 220 notifies the user of notification information indicating that there is a printable study material content with the study material content ID A002, at 17:30 on Dec. 28, 2017. For example, "You can print Grade-8 Mathematics Review Exercise Book 2 (A002)." is displayed in the notification display portion 1408 in FIG. 12. Then, at 17:35 on Dec. 28, 2017, the video distribution app 220 notifies the user of notification information indicating that there is a printable study material content with the study material content ID A003 via the client terminal. This notification information is displayed as, for example, "You can print Grade-8 Mathematics Preparation Exercise Book 2 (A003)." in the notification display portion 1408 in FIG. 12.

Here, the client user operates the input apparatus 105 of the client terminal 100 to enter an instruction to print the printable study material content displayed in the notification display portion 1408 while the video of the online class is reproduced on the client app 110. As a result, in S1103, the client app 110 sends a study material content print request to the video distribution app 220. This study material content print request contains the identification information (user ID) and the study material content ID. In the present embodiment, using the client app 110 requires the user to log in to the video distribution system 200. Hence, the identification information (user ID) of each user who is to log in is set at a unique value.

In S1104, in response to the above operation by the above client user, the video distribution app 220 obtains the study material content ID contained in the study material content print request. Here, the video distribution app 220 refers to the management table 1005 in FIG. 10E with the obtained study material content ID as a key to obtain information on the study material content. The video distribution app 220 then sends the identification information (user ID) and the information on the study material content contained in the study material content print request to the bot application 310.

In S1105, in response to receiving the identification information (user ID) and the information on the study material content, the bot application 310 refers to the management table 1001 in FIG. 10A with the identification information (user ID) as a key. The bot application 310 then obtains the printer ID of the printer that will perform printing. For example, in a case where the identification information (user ID) is "C0001", the bot application 310 refers to the management table 1001 to identify the printer ID "03679" corresponding to the identification information (user ID) "C0001", and obtains this. Note that the above-mentioned information on the study material content contains the path (URI) to the area storing the file of the print content, the study material content ID, and the like. Also, although not illustrated in FIGS. 15A and 15B, if succeeding in obtaining the printer ID in S1105, the bot application 310 sends a message 1301, 1321, or 1331 and waits for a message 1302, 1322, or 1332. Note that the bot application 310 sends a message 1323 to the client terminal if receiving a message that refuses the printing, such as the message 1322.

If receiving the print request message 1302, the bot application 310 issues a print request ID and generates print request information in S1106. Note that the print request information contains print setting information, the identification information (user ID) contained in the study material content print request in S1103, and the information on the printing target study material content received in S1105 (the path (URI) to the area storing the files of the print content. The print request information further contains the study material content ID, the application ID, and the printer ID identified in S1105. Note that the print request information generated in S1106 is managed in association with the print request ID.

In S1107, the bot application 310 sends the above print request information as a print request to the web application 430. In this example, the application ID is "BOT0001" shown in FIG. 10B. This processing in S1107 is print request processing for printing a printing target study material content by using the printing apparatus corresponding to the identification information (user ID) contained in the print request message 1301, 1321, or 1331 in FIG. 16A, 16B, or 16D. Here, the printing apparatus corresponding to the identification information (user ID) contained in the print request message 1301, 1321, or 1331 is the printer 500 or 720.

In S1108, the web application 430 stores the received print request information. At this time, the web application 430 issues a print job ID generated from the print request ID contained in the print request information, and stores the print job ID and the print request information in association with each other. The web application 430 further searches the management table 1002 in FIG. 10B based on the application ID and the printer ID contained in the received print request information. The web application 430 then checks whether the combination of the application ID and the printer ID contained in the print request is stored in FIG. 10B. For example, in S1122, a notification indicating that a combination of the ID of the bot application 310 and a printer ID (e.g., 03679) is registered in FIG. 10B is sent. In response to receiving this notification, in S1123, the bot application 310 sends a message 1303 to the client terminal (S1124) through the video distribution app 220. Alternatively, communication of messages 1331 to 1333 as illustrated in FIG. 16D is made if a notification indicating that a combination of the ID of the bot application 310 and a printer ID (e.g., 35126) is registered in FIG. 10B is sent in S1122.

Here, assume that the client user has issued an instruction to perform printing with a button 1304 or 1334 in the print operation message 1303 or 1333 displayed on the client terminal 100 (or 6000). In this case, a message indicating a print request is sent from the client terminal 100 (or 6000) to the web application 430 via the video distribution app 220 and the bot application 310 in S1125, S1126, and S1127.

The web application 430 identifies the print request information stored in S1108 based on the user ID and the print request ID contained in the notification in S1127. The print request ID and the print job ID partly share the same information (e.g., "0088"). This enables the web application 430 to identify the print request information from the user ID and the print request ID. Then, in S1109, based on the information on the printing target study material content (the path (URI) to the area storing the print content file) contained in the identified print request information, the web application 430 downloads the print content file. The web application 430 then converts the print content file into print data of a format that is processable by the printer designated in the print request information (printer 500 or 720), and stores this print data and information such as its path (URI) in the file storage 410.

Subsequently, in S1110, the web application 430 stores information on the print data stored in S1109 into the management table 1009 in FIG. 10I. Then, in S1109, the web application 430 generates a print job from the path (URI) to the print data stored in the file storage 410 and the print setting information contained in the print request information. In a specific example, the web application 430 generates a color print job in a case where the color mode is "color", and the web application 430 generates a monochrome print job in a case where the color mode is "monochrome". Moreover, the web application 430 generates an A3 print job in a case where the paper size is "A3", and the web application 430 generates a B5 print job in a case where the paper size is "B5". Here, the web application 430 stores the print job ID in the database 440 in association with the identification information (user ID) and the study material content ID.

In S1111, the web application 430 sends the generated print job to the print service 420.

In S1112, in response to receiving the print job, the print service 420 sends a print job notification to the associated printer (500 or 720).

In S1113, in response to receiving the print job notification, the printer (500 or 720) sends a print job request to the print service 420.

In S1114, in response to receiving the print job request, the print service 420 sends the print job to the printer (500 or 720) as a response to the request.

In S1115, in response to receiving the print job, the printer (500 or 720) performs printing based on this print job. Specifically, in this processing in S1115, the print data converted into the format processable by the printer (500 or 720) designated in the print request information is sent to this printer. This print data is the data generated based on the print content file of the study material content downloaded by the web application 430 in S1109, and the printer (500 or 720) that has received the print data performs the printing. In this way, the client user can obtain a printed product of the study material content requested to be printed.

In a case where the processing of outputting the study material content is completed, then in S1116, the printer (500 or 720) sends a print result notification to the print service 420. The print result notification contains the print job ID, the result indicating, for example, whether the printing has finished properly, has finished due to an error, or has been canceled, and the number of actual pages properly printed by the printer (500 or 720).

In S1117, in response to receiving the print result notification, the print service 420 sends a print result notification to the web application 430. The print result notification contains the print job ID, the result indicating, for example, whether the printing has finished properly, has finished due to an error, or has been canceled, and the number of actual pages properly printed by the printer 500 or 720. Here, the web application 430 stores the information on the print result and the number of printed pages in FIG. 10I.

In S1118, the web application 430 sends a print result notification to the bot application 310. The print result notification contains the print job ID, the result indicating, for example, whether the printing has finished properly, has finished due to an error, or has been canceled, and the number of actual pages properly printed by the printer (500 or 720).

In S1119, in response to receiving the print result notification, the bot application 310 creates a print result message as a notification of the print result by using the information on the study material content which can be referred to with the study material content ID as a key and the print result notification. The bot application 310 then sends pieces of information such as the created print result notification message and the number of actual pages properly printed by the printer (500 or 720) along with the user ID to the video distribution app 220. At this time, the bot application 310 issues a request to send these pieces of information to the client terminal.

Figure 16A:
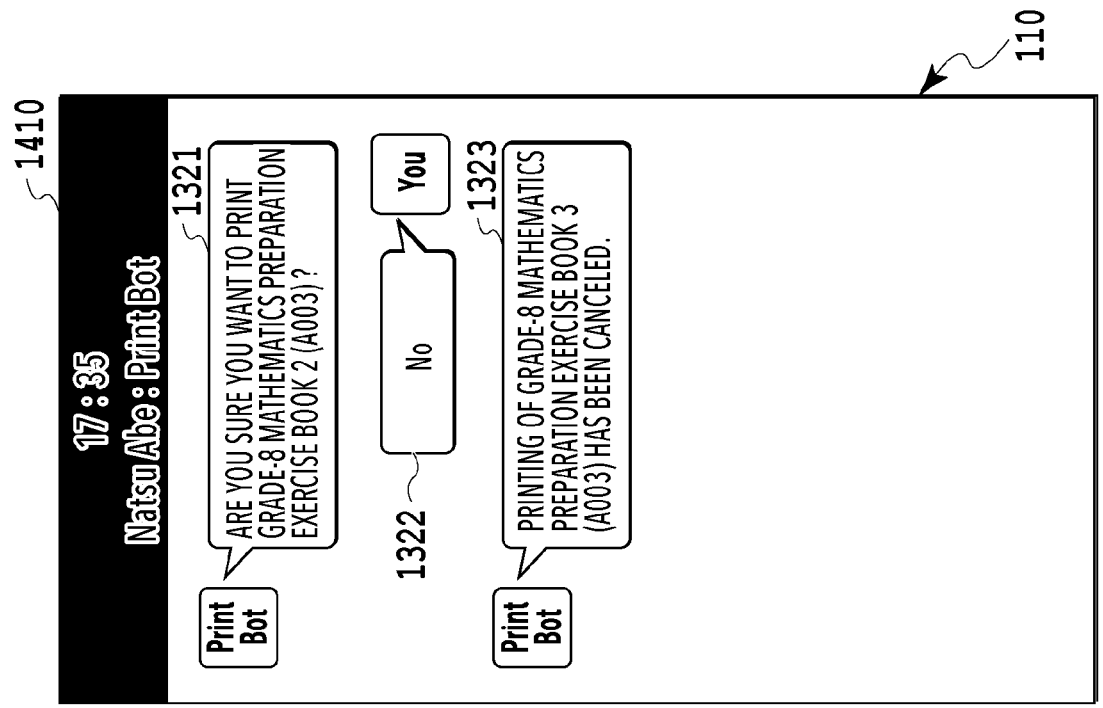

In S1120, in response to receiving the request to send the print result message, the video distribution app 220 sends the print result message to the client app 110 or 610. As a result, as illustrated in FIG. 16A or 16D, the client app 110 or 610 displays a print result message 1307 or 1337 in the talk screen. In S1121, from among the pieces of information on the study material content that can be referred to with the study material content ID as a key, the video distribution app 220 obtains the price of the study material content. After this, the video distribution app 220 obtains the identification information (user ID) associated with the print job ID. For example, the video distribution app 220 sends a request to obtain the user ID to the web application 430. Note that this obtaining request contains the print job ID. In response to receiving this, the web application 430 identifies the user ID corresponding to the print job ID and sends it to the video distribution app 220. By the above processing, the video distribution app 220 can obtain the identification information (user ID) associated with the print job ID. The video distribution app 220 then sends the identification information (user ID), the price of the study material content, the number of pages in the study material content, and the number of properly printed pages to the accounting system 5000.

The accounting system 5000 stores the received identification information (user ID), price of the study material content, number of pages in the study material content, and number of properly printed pages in the database 5100. In this processing, the accounting system 5000 may recalculate the price of the study material content by using the information on the number of pages in the study material content and the number of properly printed pages, and store an adjusted result in the database 5100. For example, in a case where the study material content with the study material content ID B002 has been printed, the accounting system 5000 accesses the video distribution app 220 and, from the management table 1005 in FIG. 10E, obtains the information indicating that the number of pages in the study material content is 100 pages. Then, in a case where the printing of all 100 pages has been completed and all pages have been properly printed, the accounting system 5000 stores a predetermined price (e.g., 10,000 yen) in the database 5100 as the study material fee for the client user with the identification information (user ID). Assume now that the printing has been properly done up to 80 pages and the client user has then canceled the printing due to running out of paper. In this case, the accounting system 5000 stores a price of 8,000 yen for the 80 pages out of the 100 pages in the database 5100 as the study material fee for the client user with the identification information (user ID). The processing sequence is then terminated. Note that the accounting system 5000 can employ a scheme in which it calculates the amount of money for use of another service(s) provided to each client by the video distribution system as well as the amount of money for the study material content (study material fee) as described above, and presents the calculated results to the client.

(Printing Operation)

The display of screens in a case of performing a printing operation will be described using FIGS. 16A to 16D.

FIG. 16A illustrates an example of a message talk screen displayed on the display apparatus 104 of the client terminal 100 by the client app 110. Note that the user name of the client app 110 is "Natsu Abe" in the present embodiment. In the message talk screen 1410 provided by the client app 110, messages and files sent from Natsu Abe and the message talk partner are displayed in chronological order from the top. Here, the balloons from the left of the screen represent messages sent by a participant other than the person herself (Natsu Abe) participating in the online class. The balloon from the right of the screen represents a message sent by the person herself (Natsu Abe) using the client app 110. In the example of FIG. 16A, the participant of the online class other than Natsu Abe is the bot application 310 being a virtual user, and they are displayed as "Natsu Abe:Print Bot" at the top of the screen. Also, the bot application 310 is displayed as "Print Bot" in its icons on the left of the screen.

In FIG. 16A, the bot application 310 sends the print request message 1301 about whether to start printing a printing target study material content (file). Specifically, the bot application 310 obtains the information on the title and price of the study material from the video distribution app 220 by using the study material content ID obtained in S1104. The bot application 310 generates, for example, the message 1301 by using the information obtained from the video distribution app 220. The price of this study material content is not contained and thus not displayed in the print request message 1301 since this is a special case where the price of this study material content (study material content ID A002 (FIG. 10E)) is 0 yen. Natsu Abe, by following a preset format, sends the print request message 1302 containing identification information (Print Bot) and text information "Yes" as a message addressed to the bot. The sending and receiving of the print request messages 1301 and 1302 described above are executed between S1105 and S1106 in FIG. 15A. Note that in S1106 in FIG. 15A the bot application 310 issues a print request ID (FIG. 10H) uniquely identifying a print request, and associates this print request ID with the print request message 1302 (FIG. 16A). In response to receiving the print request message 1302, the bot application 310 determines that print processing is needed, since the print request message 1302 contains the identification information (Print Bot) and the text information "Yes" as a message addressed to the bot.

The bot application 310 stores initial print setting information in the file storage 340 in association with the print request ID. Note that the bot application 310 identifies Natsu Abe as the print destination client user by the processing in S1105 in FIG. 15A (destination printer check processing). The bot application 310 then sends the print operation message 1303 (FIG. 16A) to Natsu Abe identified as the print destination client user (S1123 and S1124). The print operation message 1303 contains the buttons 1304 and 1305 and a button 1306 (FIG. 16A) as well as a text line indicating that the file (data) of the study material content has been received. Also, the print operation message 1303 is associated with the print request ID. With these such buttons, settings can be configured so as to send a fixed message to the talk partner or launch the web browser (120, 620) and access a particular URL in response to the client user pressing one of the buttons. Note that the text line shown in the print operation message 1303 illustrated in FIG. 16A is an example, and may be another character string. Also, the example of FIG. 16A has been presented as an example of providing buttons in a message, but the message is not limited to this. A message including objects may be employed. Note that in the present embodiment, the button 1304 may also be referred to as a print object that receives an instruction to execute printing, and the button 1305 may also be referred to as a setting object that receives setting of print setting information.

In a case where Natsu Abe presses the button 1304 in FIG. 16A, a message indicating a print request is sent from the client app 110 to the video distribution app 220 (S1125 and S1126). This message indicating a print request contains the print request ID. Thus, the bot application 310 executes print processing by using the file corresponding to the print request ID. Also, in a case where Natsu Abe presses the button 1305, an instruction to open a URL contained in the print operation message 1303 for accessing a web page to update the print settings is issued. In this case, an instruction to launch the web browser 120 of the client terminal 100 is issued from the client app 110.

Note that in the present embodiment a configuration has been described in which an operation of launching the web browser 120 with a particular URL is performed in response to pressing the button 1305. However, a similar effect can be achieved even with a configuration in which, for example, a link to the URL is directly displayed in the message instead of the button and the web browser 120 is launched in response to the client user selecting the link.

In a case where the button 1305 illustrated in FIG. 16A is pressed, the web browser 120 of the client terminal 100 requests the web page for updating the print settings from the web application (not illustrated) of the bot application server 300. Note that the processing in the case of pressing the button 1305 is executed, for example, between S1124 and S1125 in FIG. 15A. The web application (not illustrated) having received the web page request obtains the corresponding print request ID from the database 330 based on the information on the requested URL. The web application (not illustrated) generates a web page for the print settings from the initial print setting information stored in association with the obtained print request ID, and returns the web page to the client terminal 100 as a response to the above request. In sum, in the case where the client user operates the button 1305, the web application of the bot application server 300 provides a print setting screen to the client terminal 100. Also, in a case where the button 1306 for canceling the printing is pressed, a message for canceling the print request is sent from the client app 110 to the video distribution app 220. This cancellation message contains the print request ID. As a result, the bot application 310 cancels the print instruction sent to the bot application 310 by the print request message 1302.

In response to the video distribution app 220 sending a print result message to the client app 110 in S1120 in FIG. 15B, the client app 110 displays the print result message 1307 in the message talk screen 1410. In the example illustrated in FIG. 16A, the print result message 1307 indicates therein that the printing of the study material content with the study material content ID A002 has been completed.

Figure 16B:
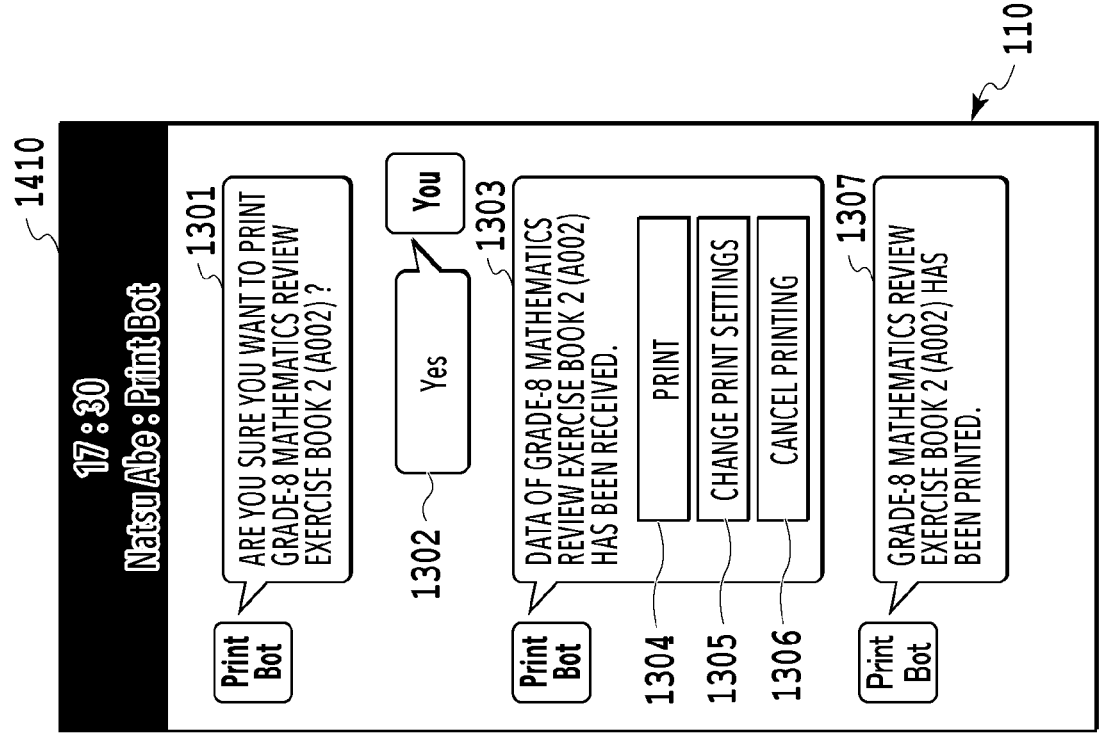

FIG. 16B illustrates another example of the message talk screen 1410 displayed on the display apparatus 104 of the client terminal 100 by the client app 110. Note that the user name of the client app 110 is "Natsu Abe" in the present embodiment. In the message talk screen 1410 provided by the client app 110, messages and files sent from Natsu Abe and the message talk partner are displayed in chronological order from the top. Here, the balloons from the left of the screen represent messages sent by a participant other than the person herself (Natsu Abe) participating in the online class. The balloon from the right of the screen represents a message sent by the person herself (Natsu Abe) using the client app 110. In the example of FIG. 16B, the participants of the online class are the person herself (Natsu Abe) and the bot application 310 being a virtual user. Here, the participants are displayed as "Natsu Abe:Print Bot" at the top of the screen. Also, the bot application 310 is displayed as "Print Bot" in its icons on the left of the screen.

In FIG. 16B, the bot application 310 sends the print request message 1321 about whether to start printing a printing target study material content (file). The price of this study material content is not contained and thus not displayed in this print request message 1321 since this is a special case where the price of this study material content (study material content ID A003) is 0 yen. Here, assume that Natsu Abe, by following a preset format, sends the print request message 1322 containing identification information (Print Bot) and text information "No" as a message addressed to the bot. In this case, in response to receiving the print request message 1322, the bot application 310 determines that print processing is not needed, since the print request message 1322 contains the identification information (Print Bot) and the text information "No" as a message addressed to the bot. The bot application 310 then sends the message 1323 indicating that the printing has been stopped to the client user Natsu Abe.

FIG. 16D illustrates an example of a message talk screen displayed on the display apparatus 104 of the client terminal 6000 by the client app 610. Note that the user name of the client app 610 is "Koichi Osaka" in the present embodiment. In the message talk screen 1410 provided by the client app 610, messages and files sent from Koichi Osaka and the message talk partner are displayed in chronological order from the top. Here, the balloons from the left of the screen represent messages sent by a participant other than the person himself (Koichi Osaka) participating in the online class. The balloon from the right of the screen represents a message sent by the person himself (Koichi Osaka) using the client app 610. In the example of FIG. 16D, the participant of the online class other than Koichi Osaka is the bot application 310 being a virtual user, and they are displayed as "Koichi Osaka:Print Bot" at the top of the screen. Also, the bot application 310 is displayed as "Print Bot" in its icons on the left of the screen.

In FIG. 16D, the bot application 310 sends the print request message 1331 about whether to start printing the printing target study material content (file). Here, Koichi Osaka, by following a preset format, sends the print request message 1332 containing identification information (Print Bot) and text information "Yes" as a message addressed to the bot. Note that the bot application 310 has issued a print request ID uniquely identifying the print request in S1106 in FIG. 15A, and associates this print request ID with the print request message 1332. In response to receiving the print request message 1332, the bot application 310 determines that print processing is needed, since the print request message 1332 contains the identification information (Print Bot) and the text information "Yes" as a message addressed to the bot.

The bot application 310 also stores initial print setting information in the file storage 340 in association with the print request ID. Note that the bot application 310 identifies Koichi Osaka as the print destination client user by the destination printer check processing in S1105 in FIG. 15A. The bot application 310 then sends the print operation message 1333 to Koichi Osaka identified as the print destination client user. The print operation message 1333 contains the buttons 1334 and 1335 and a button 1336 as well as a text line indicating that the file (data) of the study material content has been received. Also, the print operation message 1333 is associated with the print request ID. Settings can be configured such that, by operating one of these buttons, the client user can send a fixed message to the talk partner or launch the web browser and access a particular URL in response to pressing the button. Note that the text line shown in the print operation message 1333 is an example, and may be another character string. Also, FIG. 16D illustrates an example of providing buttons in the print operation message 1333, but the print operation message 1333 is not limited to this and may be a message including other objects. Note that in the present embodiment, the button 1334 may also be referred to as a print object that receives an instruction to execute printing, and the button 1335 may also be referred to as a setting object that receives setting of print setting information.

In a case where Koichi Osaka presses the button 1334 in FIG. 16D, a message indicating a print request is sent from the client app 610 to the video distribution app 220. This message indicating a print request contains the print request ID. Thus, the bot application 310 executes print processing by using the file corresponding to the print request ID. Also, in a case where Koichi Osaka presses the button 1335, an instruction to open a URL contained in the print operation message 1333 for accessing a web page to update the print settings is issued. In this case, an instruction to launch the web browser 620 of the client terminal 6000 is issued from the client app 610.

Note that in the present embodiment a configuration has been described in which an operation of launching the web browser 620 with a particular URL is performed in response to pressing the button 1335. However, a similar effect can be achieved even with a configuration in which, for example, a link to the URL is directly displayed in the message instead of the button and the web browser 620 is launched in response to the client user selecting the link.

In a case where the button 1335 illustrated in FIG. 16D is pressed, the web browser 620 of the client terminal 6000 requests the web page for updating the print settings from the web application (not illustrated) of the bot application server 300. The web application (not illustrated) having received the web page request obtains the corresponding print request ID from the database 330 based on the information on the requested URL. The web application (not illustrated) generates a web page for the print settings from the initial print setting information stored in association with the obtained print request ID, and returns the web page to the client terminal 6000 as a response to the above request. In sum, in the case where the client user operates the button 1335, the web application of the bot application server 300 provides a print setting screen to the client terminal 6000. Also, in a case where the button 1336 for canceling the printing is pressed, a message for canceling the print request is sent from the client app 610 to the video distribution app 220. This cancellation message contains the print request ID. As a result, the bot application 310 cancels the print instruction sent to the bot application 310 by the print request message 1332.

In response to the video distribution app 220 sending a print result message to the client app 610 in S1120 in FIG. 15B, the client app 610 displays the print result message 1337 in the message talk screen 1410. In the example illustrated in FIG. 16D, the print result message 1337 indicates therein that the printing of the study material content with the study material content ID B002 has been completed and that ¥10,000 will be charged as the study material fee.

FIG. 16C illustrates an example of a print setting screen 1310 for configuring the print settings returned from the web application (not illustrated) of the bot application server 300. Note that in the present embodiment the print setting screen 1310 is a web page. In the print setting screen 1310, the client user can use fields provided as setting items 1311 to change the setting values of print setting items such as the paper size, paper type, layout, quantity, and color mode. Note that the print settings included in the setting items 1311 are an example, and other print settings can also be included according to the functions of the printer (500 or 720), for example.

Specifically, for example, two choices "Color" and "Monochrome" can be displayed for the color mode in the case of a color printer, and only one choice "Monochrome" can be displayed for the color mode in the case of a monochrome printer. Moreover, three choices "Fine", "Normal", and "Draft" may be displayed for the print quality in the case of one printer, and two choices "Normal" and "Draft" may be displayed for the print quality in the case of another printer. As for the choices for the paper size and the paper type, too, different choices may be displayed for each printer.

In a case where a button 1312 provided at a lower portion of the print setting screen 1310 is pressed, the currently selected setting value of each print setting item is fixed and the print setting screen 1310 is closed. That is, the bot application 310 updates the initial print setting information stored in association with the print request ID and corresponding to the print setting screen 1310 to the values set by using FIG. 16C. In a case where a button 1314 is pressed, the contents of the print settings changed so far are discarded. Moreover, the web browser 120 is terminated and closed.

In response to receiving the client user's setting operation on the print setting screen 1310 as illustrated in FIG. 16C, the bot application 310 associates information on the printing target study material content with the information set in the print setting screen 1310 and the print request ID. The bot application 310 then stores the information associated with the print request ID in the database 330. Here, the information on the study material content is a path (URI) indicating the area storing the file of the print content. Note that in the description of the present embodiment, the process of sending the print operation message 1303 and operations using FIG. 16C are executed between S1124 and S1125. However, these processes may be performed, for example, between S1104 and S1106 in FIG. 15A.

In response to executing the above operations, the message talk screen 1410 including the print operation message 1303 or 1333 as illustrated in FIG. 16A or 16D is displayed again on the client terminal 100 or 6000. Here, in a case where Natsu Abe or Koichi Osaka presses the button 1304 or 1334, a message indicating a print request is sent from the client app 110 or 610 to the video distribution app 220 (S1125). Since this message indicating a print request contains the print request ID, the bot application 310 executes print processing by using the file and the print setting information associated with the print request ID. Specifically, in a case where the print setting information has been updated using the print setting screen 1310, the bot application 310 generates print request information for printing the file associated with the print request ID with the updated print setting information. As a result, the print setting information contained in the print request information is changed to the print setting information changed using FIG. 16C. Note that the subsequent processing, or the processing in and after S1127, has been described earlier with FIG. 15A, and detailed description thereof is omitted.

Each of the messages in FIGS. 16A, 16B, and 16D sent by the bot application 310 is sent through a procedure similar to those for the print result message send request and the print result message shown in S1119 and S1120 in FIG. 15B. Specifically, each message sent by the bot application 310 is sent to the video distribution app 220 and the client app 110 or 610 in this order and displayed in the message talk screen 1410.

As described above, according to the present embodiment, a printed product can be easily obtained in a timely manner by using a client terminal connected to the server system. Also, as a comparative example of the present embodiment, a system has been known in which by clicking an advertisement within a web site or the like displayed in the screen of a web browser or the like, a user can travel to an online shop and purchase a target book, product, or the like. However, with a system of such a comparative example, it takes time to deliver the target book or product to the user. In contrast, according to the present embodiment, a necessary printed product can be easily obtained in a timely manner, as described above. This significantly improves convenience as compared to the comparative example.

Other Embodiments

In the above embodiment, an example has been presented in which messages are exchanged using the video distribution app 220 of the video distribution system to print a study material content (printing target file). However, another configuration can be employed instead. For example, the client apps 110 and 610 may be applications for the video distribution app 220 or the web browsers 120 and 620, instead of applications for the video distribution system. In this case, the participants of an online class are talk partners.

Also, in the above embodiment, while the video distribution app 220 distributes video information of a class with a video content, a live class, or the like, a notification of a printable study material content is made at the time designated in the study material content ID and distribution time in the management table 1004. Then, the study material content is printed using a printer owned by the attender (client user) (the printer installed in the same client system). However, the configuration is not limited to one as the above, and a configuration in which another type of distribution information is provided can be employed. For example, instead of a class with a video content or a live class, a class with a still image content (still image information) and audio information may be distributed and, in the class, a notification of a printable study material content may be made at a time designated in a manner as described above. Also, the timing of making a notification of a printable study material content is not limited to a designated time. For example, a notification of a study material content may be made according to the timing at which a particular frame in a video content is reproduced. Alternatively, a notification of a study material content may be made at the timing at which a particular page in a still image content is referred to. Note that in the present embodiment, the notification of the notification information on the study material content is finished in a case where the provision of the distribution information is finished.

Also, the number of printers provided in each client system is not particularly limited. A plurality of printers may be provided in a single client system. The plurality of printers may have the same functions or different functions. In the case of providing a plurality of printers for the client terminal 100, a study material content can be printed with a particular printer selected from among the plurality of printers. The particular printer is not limited to one printer but may be a plurality of printers. That is, a plurality of printers may be caused to print the same study material content. In this case, the plurality of printers can be caused to output the same study material content in the same output form or in different output forms. For example, a first printer may be caused to output a monochrome image while a second printer may be caused to output a color image. Also, each printer can be caused to output an image in a different size. Moreover, in a case of being notified of a plurality of printable study materials from the server, the printers to be used for the printing may be allocated according to the printable study materials. For example, the printers can be allocated such that a first printer is caused to print a first study material and a second printer is caused to print a second study material. Such allocation of the printers is effective in a case where each printer differ in function and performance and the like.

Embodiment(s) of the present feature can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present feature has been described with reference to exemplary embodiments, it is to be understood that the feature is not limited to the disclosed exemplary embodiments. The scope of the following claims is to be accorded the broadest interpretation so as to encompass all such modifications and equivalent structures and functions.

This application claims the benefit of Japanese Patent Application No. 2020-197192 filed Nov. 27, 2020, which is hereby incorporated by reference herein in its entirety.

What is claimed is:

1. A print system comprising:

a client terminal;

a server system that provides predetermined distribution information to the client terminal; and at least one printing apparatus communicatively connected to the server system, wherein the server system includes a memory containing instructions and a processor that executes the instructions to notify the client terminal of notification information indicating that a printable print content is present based on provision of the distribution information to the client terminal, the client terminal includes a memory containing instructions and a processor that executes the instructions to send the server system a print request as a request to perform printing in a case of being notified of the notification information, and wherein the server system further executes instructions to issue a print job for printing the print content to a printing apparatus identified by the print request from the client terminal, and the printing apparatus prints the print content according to the print job, wherein the server system provides at least one of video information or still image information for an online class to the client terminal as the distribution information, the notification information indicates that a printable study material for the online class is present as the print content, and the server system executes instructions to issue a print job for printing the study material.

2. The print system according to claim 1, wherein the server system executes instructions to notify the client terminal of the notification information while the distribution information is provided to the client terminal.

3. The print system according to claim 1, wherein the print request issued from the client terminal contains first identification information corresponding to the client terminal and second identification information corresponding to the printing apparatus to be caused to execute the printing of the print content, and the server system issues the print job to the printing apparatus corresponding to the second identification information based on the first identification information and the second identification information.

4. The print system according to claim 3, wherein the client terminal forms a client system with the at least one printing apparatus, and the client terminal sends the server system a print request for executing the printing of the print content by using the printing apparatus present in the same client system as that of the client terminal.

5. The print system according to claim 4, wherein the server system is connected to a plurality of the client systems, and the client terminals in the plurality of client systems are given different pieces of the first identification information, and the printing apparatuses in the plurality of client systems are given different pieces of the second identification information.

6. The print system according to claim 1, wherein the distribution information is information containing at least one of video information or still image information.

7. The print system according to claim 1, wherein the server system is connected to an accounting system that calculates a fee for the client terminal to use a service provided by the server system, and the server system sends the usage fee calculated by the accounting system to the client terminal.

8. The print system according to claim 7, wherein the usage fee is determined according to an amount of the print content printed with the printing apparatus.

9. The print system according to claim 1, wherein the client terminal includes a display that displays a video viewing screen sent from the server system, and the notification information is displayed in one region in the video viewing screen.

10. The print system according to claim 1, wherein the server system includes a first server that provides the distribution information and the notification information to the client terminal, a second server that has a message to be sent to the client terminal, and a third server that sends the print job to the printing apparatus.

11. The print system according to claim 1, wherein the server system executes instructions to finish the notification of the notification information in a case where the provision of the distribution information is finished.

12. A control method of controlling a print system including a client terminal, a server system that provides predetermined distribution information to the client terminal, and at least one printing apparatus communicatively connected to the server system, the control method comprising:

notifying the client terminal of notification information indicating that a printable print content is present based on provision of the distribution information to the client terminal;

sending the server system a print request as a request to perform printing with a particular printing apparatus in a case of being notified of the notification information;

receiving the print request from the client terminal and sending a print job for printing the print content to a printing apparatus identified by the print request; and printing the print content according to the print job, wherein the server system provides at least one of video information or still image information for an online class to the client terminal as the distribution information, the notification information indicates that a printable study material for the online class is present as the print content, and a print job for printing the study material is issued.

13. A non-transitory computer readable storage medium storing a program for causing a computer to execute:

a step of providing predetermined distribution information to a client terminal;

a step of notifying the client terminal of notification information indicating that a printable print content is present based on provision of the distribution information to the client terminal; and a step of receiving a print request for printing the print content with a particular printing apparatus from the client terminal and sending a print job for printing the print content to the particular printing apparatus, wherein at least one of video data or still image data for a class is provided to the client terminal as the distribution information, the client terminal is notified of study material information related to the class by means of the notification information, and a print job for printing the study material is sent to the particular printing apparatus.

14. The non-transitory computer readable storage medium according to claim 13, wherein the client terminal is notified of the notification information while the distribution information is provided to the client terminal.

15. The non-transitory computer readable storage medium according to claim 13, wherein the print request issued from the client terminal contains identification information corresponding to the printing apparatus to be caused to execute the printing of the print content, and the print job is issued to the printing apparatus corresponding to the identification information.

* * * * *